(12) United States Patent
Dyer et al.

(10) Patent No.: US 7,047,135 B2
(45) Date of Patent: May 16, 2006

(54) METHOD AND SYSTEM OF EVALUATING PERFORMANCE OF A CROP

(75) Inventors: James Scott Dyer, Fort Collins, CO (US); Jerry Ray Halterman, Fort Collins, CO (US); Gerhard Josef Hunner, Fort Collins, CO (US); George Bailey Muehlbach, Fort Collins, CO (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/258,582

(22) Filed: Oct. 25, 2005

(65) Prior Publication Data

US 2006/0074560 A1 Apr. 6, 2006

Related U.S. Application Data

(63) Continuation of application No. 10/744,307, filed on Dec. 23, 2003.

(60) Provisional application No. 60/444,592, filed on Jan. 31, 2003.

(51) Int. Cl.
G06Q 50/00 (2006.01)

(52) U.S. Cl. ............................ 702/5; 702/2; 705/10

(58) Field of Classification Search ............... 702/2, 702/3, 5; 701/50; 705/1, 7–10
See application file for complete search history.

(56) References Cited

U.S. PATENT DOCUMENTS

| | | | |
|---|---|---|---|
| 4,712,424 A | 12/1987 | Herron | 72/152 |
| 4,992,942 A | 2/1991 | Bauerle et al. | 700/284 |
| 5,467,271 A | 11/1995 | Abel et al. | 364/420 |
| 5,771,169 A | 6/1998 | Wendte | 364/420 |
| 5,845,229 A | 12/1998 | Rawlins | 702/2 |
| 5,870,689 A | 2/1999 | Hale et al. | 702/5 |
| 5,878,371 A | 3/1999 | Hale et al. | 702/5 |
| 5,884,224 A | 3/1999 | McNabb et al. | 702/2 |
| 6,044,324 A | 3/2000 | Boerhave et al. | 702/5 |
| 6,119,531 A | 9/2000 | Wendte et al. | 73/863.52 |
| 6,141,614 A | 10/2000 | Janzen et al. | 701/50 |
| 6,327,569 B1 | 12/2001 | Reep | 705/1 |
| 6,453,303 B1 | 9/2002 | Li | 705/36 |
| 6,505,146 B1 | 1/2003 | Blackmer | 702/189 |
| 6,651,005 B1 | 11/2003 | O'Neall | 702/5 |
| 6,751,576 B1 | 6/2004 | Hall et al. | 702/183 |
| 6,778,872 B1 | 8/2004 | Jorgenson et al. | 700/106 |
| 6,865,542 B1 | 3/2005 | Cox et al. | 705/10 |
| 6,865,582 B1 | 3/2005 | Obradovic et al. | 707/104.1 |
| 2001/0011437 A1 | 8/2001 | Shortridge et al. | 47/58.1 |
| 2001/0032161 A1 | 10/2001 | Thomas et al. | 705/36 |
| 2001/0037182 A1 | 11/2001 | Hall et al. | 702/104 |
| 2002/0022928 A1 | 2/2002 | Ell | 702/2 |
| 2002/0022929 A1 | 2/2002 | Ell | 702/5 |
| 2002/0023052 A1 | 2/2002 | Remley et al. | 705/38 |

(Continued)

Primary Examiner—Donald McElheny, Jr.

(57) ABSTRACT

A method and system of evaluating crop performance facilitates characterization of the environmental impact of a geographic region or areas within the region for growing plant-life. Environmental measurements are obtained. The environmental measurements are associated with a geographic region. Each environmental measurement includes at least one of soil data and weather data. Respective location data is obtained. The location data is associated with corresponding environmental measurements. An estimated performance characteristic is determined for a particular crop planted in the geographic region based on the obtained environmental measurements and respective location data. Contours are established for one or more uniform performance areas with generally uniform performance characteristic within the geographic region by applying a decision-tree analysis to the obtained environmental measurements.

20 Claims, 32 Drawing Sheets

U.S. PATENT DOCUMENTS

| | | |
|---|---|---|
| 2002/0032644 A1 | 3/2002 | Corby et al. .................. 705/37 |
| 2002/0035431 A1 | 3/2002 | Ell ................................ 702/5 |
| 2002/0059091 A1 | 5/2002 | Hay et al. ...................... 705/8 |
| 2002/0082982 A1 | 6/2002 | Mock et al. ................... 705/37 |
| 2003/0009286 A1 | 1/2003 | Shibusawa et al. ............ 702/2 |
| 2003/0018431 A1 | 1/2003 | Hanson ......................... 702/5 |
| 2003/0225654 A1 | 12/2003 | Chavas et al. ................ 705/36 |

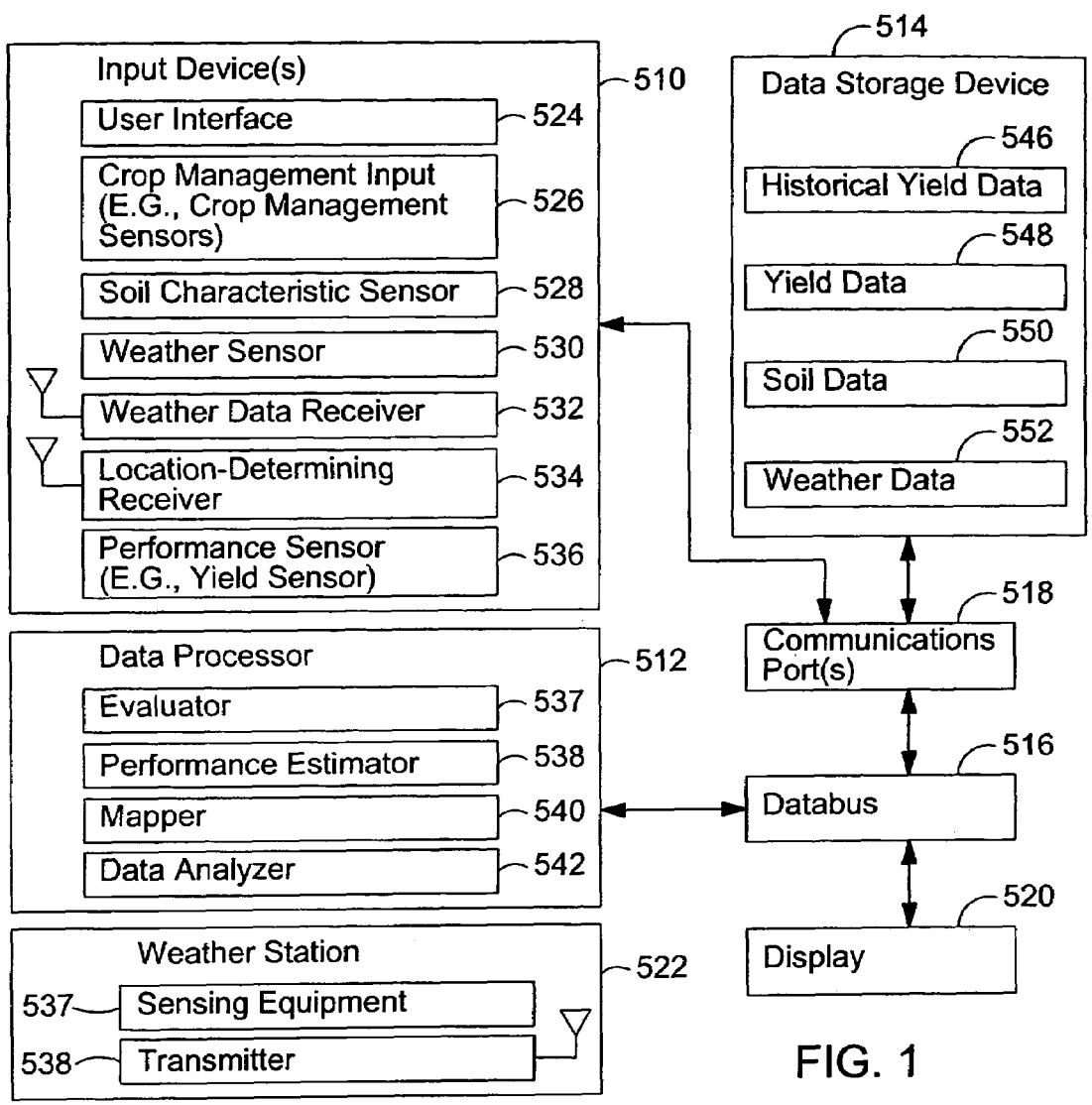
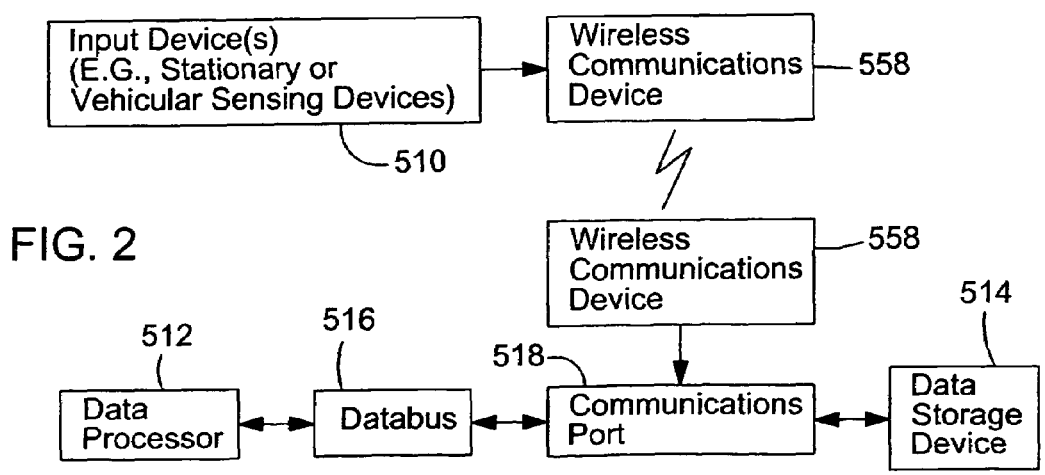

Factor 1: Surface Structure and Nutrients.
  Subfactors:
    1A. Organic Matter                        (Weight = 1/12 of Factor 1 rating)
    1B. Bulk Density                          (Weight = 1/12 of Factor 1 rating)
    1C. Clay Content                          (Weight = 1/12 of Factor 1 rating)
    1D. Available Water Capacity (AWC)  (Weight = 1/12 of Factor 1 rating)
    1E. pH                                     (Weight = 1/12 of Factor 1 rating)
    1F. Sodium Adsorption Ratio (SAR)   (Weight = 1/12 of Factor 1 rating)
    1G. Calcium Carbonate              (Weight = 1/12 of Factor 1 rating)
    1H. Gypsum                             (Weight = 1/12 of Factor 1 rating)
    1I. Cation-Exchange Capacity (CEC)  (Weight = 1/12 of Factor 1 rating)
    1J. Shrink-Swell                         (Weight = 1/12 of Factor 1 rating)
    1K. Gravelly/Cobbly                   (Weight = 1/12 of Factor 1 rating)
    1L. Stones                               (Weight = 1/12 of Factor 1 rating)

Factor 2: Water Features.
  Subfactors:
    2A. Water Table                          (Weight = 1/3 of Factor 2 rating)
    2B. Permeability                        (Weight = 1/3 of Factor 2 rating)
    2C. Available Water Capacity (AWC)  (Weight = 1/3 of Factor 2 rating)

Factor 3: Toxicity (Detrimental Chemical Attributes).
  Subfactors:
    3A. Sodium Adsorption Ration (SAR)  (Weight = 1/3 of Factor 3 rating)
    3B. Salinity                              (Weight = 1/3 of Factor 3 rating)
    3C. Cation-Exchange Capacity (CEC)  (Weight = 1/3 of Factor 3 rating)

Factor 4: Soil Reaction.
  Subfactor:
    4A. Soil pH

Factor 5: Climate.
  Subfactors:
    5A. Moisture Regime                  (Weight = 1/3 of Factor 5 rating)
    5B. Temperature Regime           (Weight = 1/3 of Factor 5 rating)
    5C. Moisture/Temperature Regime    (Weight = 1/3 of Factor 5 rating)

Factor 6: Physical Profile.
  Subfactors:
    6A. Physical Root Zone Limitation    (Weight = 1/3 of Factor 6 rating)
    6B. Root Zone
        Available Water Capacity (AWC)  (Weight = 1/3 of Factor 6 rating)
    6C. Calcium Carbonate              (Weight = 1/3 of Factor 6 rating)

Factor 7: Landscape.
  Subfactors:
    7A. Slope                                 (Weight = 1/5 of Factor 7 rating)
    7B. Other Soil Phase Features      (Weight = 1/5 of Factor 7 rating)
    7C. Ponding                             (Weight = 1/5 of Factor 7 rating)
    7D. Degree of Erosion               (Weight = 1/5 of Factor 7 rating)
    7E. Flooding                             (Weight = 1/5 of Factor 7 rating)

FIG. 9

FIG. 12 Region H – Macro CART Analysis - Soybeans
Average Yield for in Bu/AC

Region H – Soybeans Cart Analysis

Region M – Macro CART Analysis – Soybeans ...continued
Average Yield for Soybeans in Bu/AC (Bushels/Acre)

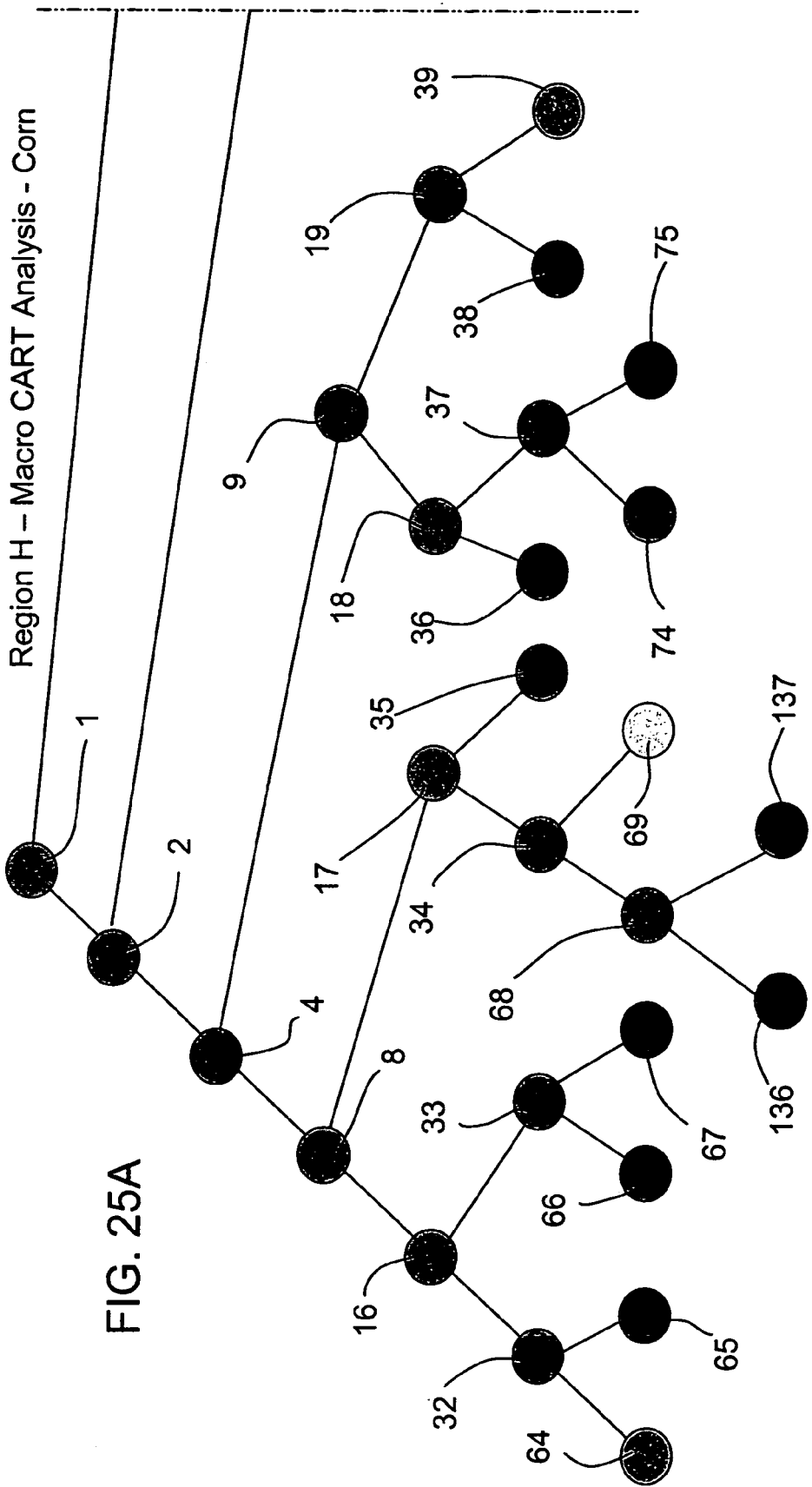

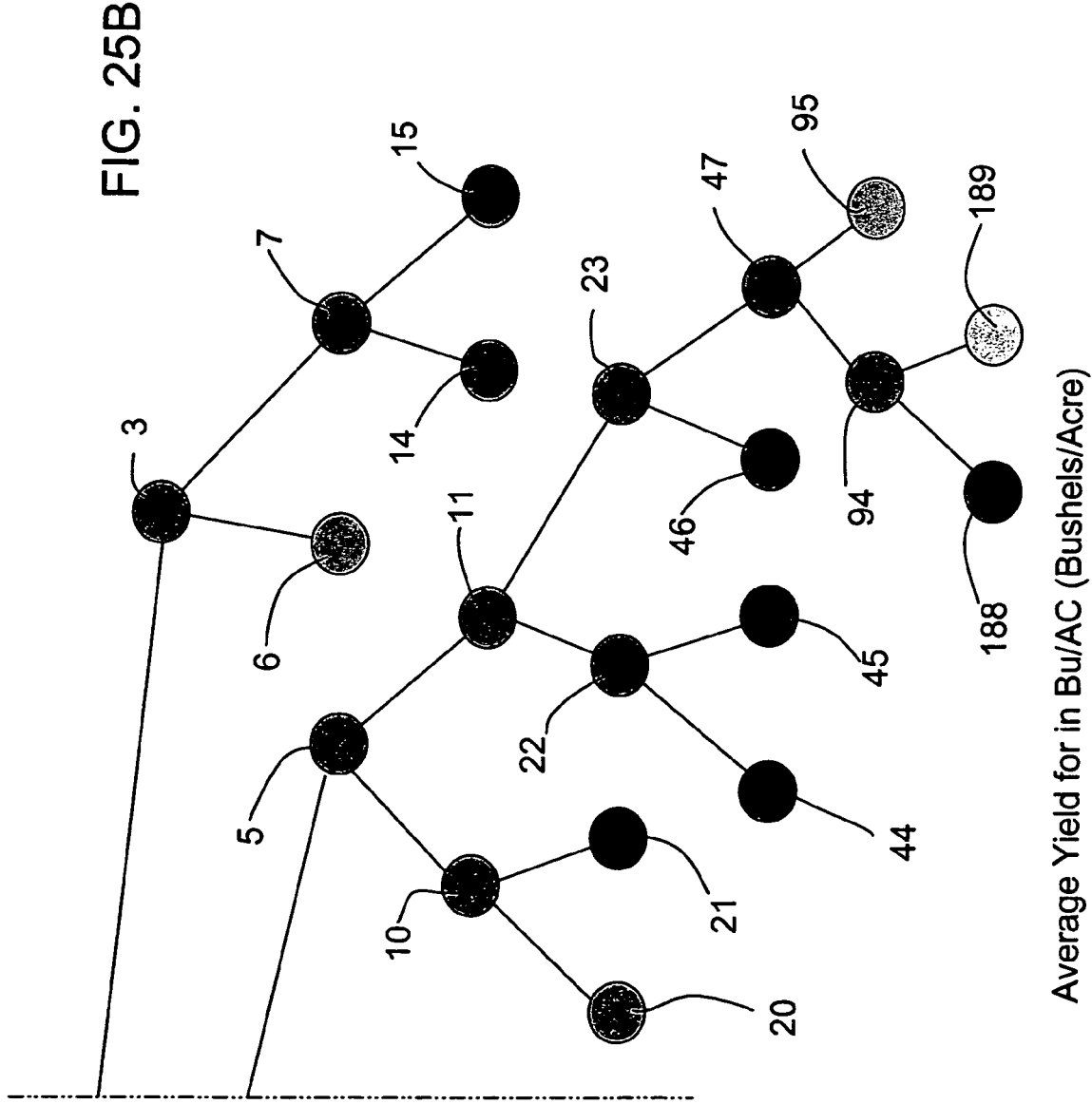

Legend

| | | | | | |
|---|---|---|---|---|---|
| 1 | GDD (4200) | 19 | RDEPTH (51.9) | 47 | CaCO3 (1.09) |
| 2 | GDD (3300) | 20 | 122.9 Bu/Acre | 64 | 118.04 Bu/Acre |
| 3 | Clay (23.29) | 21 | 153.77 Bu/Acre | 65 | 124.39 Bu/Acre |
| 4 | PPT (14) | 22 | pH (6.77) | 66 | 150.46 Bu/Acre |
| 5 | PPT (14) | 23 | OM (0.86) | 67 | 127.0 Bu/Acre |
| 6 | 96.37 Bu/Acre | 32 | OM (0.89) | 68 | BD (1.30) |
| 7 | Ph (7.68) | 33 | AWCRZ (1.80) | 69 | 99.7 Bu/Acre |
| 8 | PPT (12) | 34 | pH (7.52) | 74 | 105.3 Bu/Acre |
| 9 | CaCO3 (1.57) | 35 | 132.6 Bu/Acre | 75 | 114.8 Bu/Acre |
| 10 | AWC (7.79) | 36 | 107.6 Bu/Acre | 94 | CEC (17.11) |
| 11 | PPT (17) | 37 | AWCRZ (2.17) | 95 | 61.2 Bu/Acre |
| 14 | 87.84 Bu/Acre | 38 | 108.8 Bu/Acre | 136 | 117.07 Bu/Acre |
| 15 | 66.27 Bu/Acre | 39 | 113.06 Bu/Acre | 137 | 115.35 Bu/Acre |
| 16 | AWCRZ (1.59) | 44 | 116.55 Bu/Acre | 188 | 73.67 Bu/Acre |
| 17 | Gypsum (0.01) | 45 | 117.8 Bu/Acre | 189 | 67.03 Bu/Acre |
| 18 | AWCRZ (2.08) | 46 | 103.4 Bu/Acre | | |

FIG. 25C

CART Corn Region "K" Macro
Average Yield for Corn in Bu/AC (Bushels/Acre)

Region L – Macro CART Analysis – Corn

Average Yield for Corn in Bu/AC (Bushels/Acre)
Production Index Region L

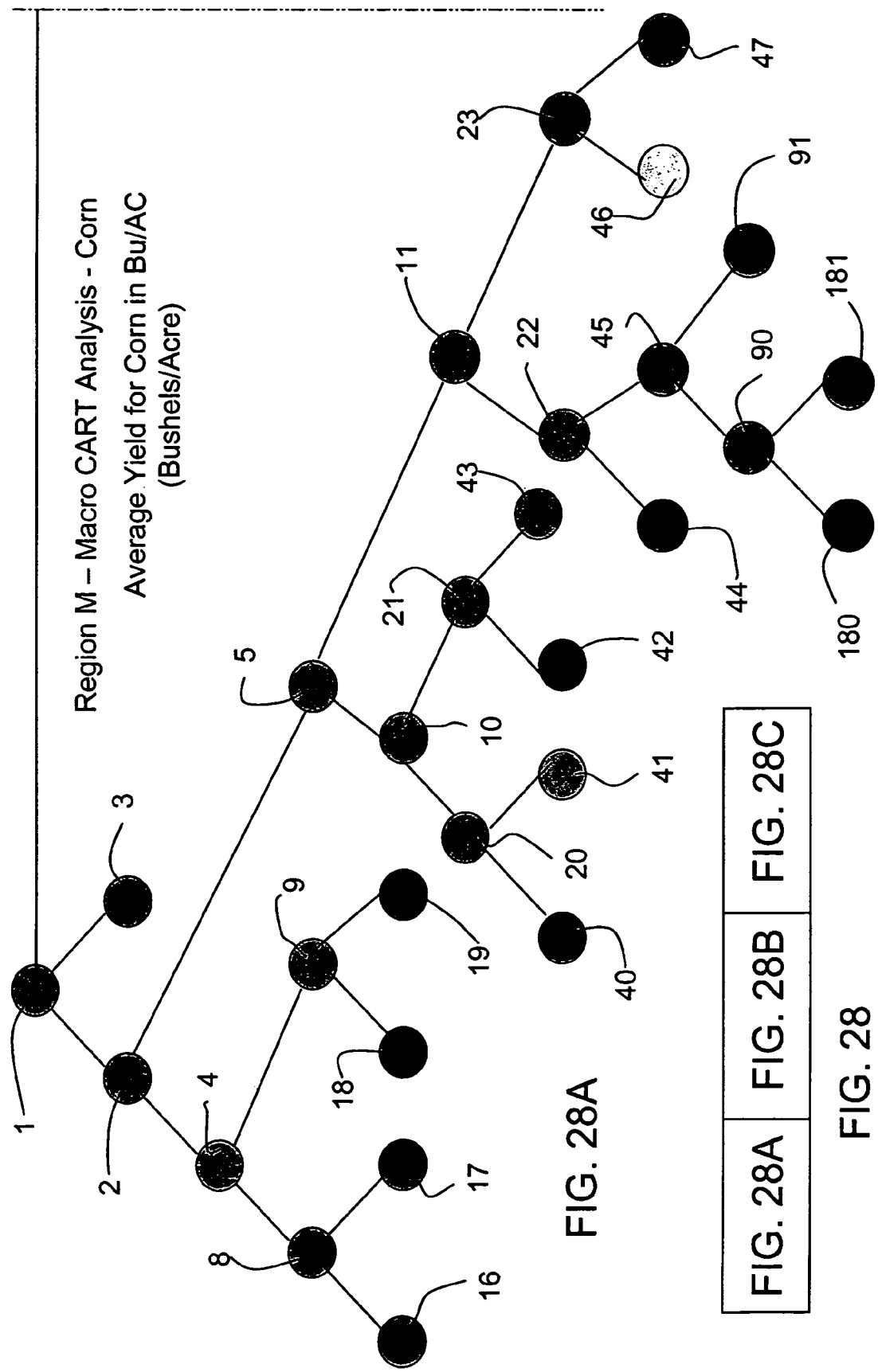

Region M – Macro CART Analysis – Corn ...continued
Average Yield for Corn in Bu/AC
(Bushels/Acre)

FIG. 28C Legend

| 1 | GDD (3000) |
|---|---|
| 2 | AWCRZ (1.73) |
| 3 | RDEPTH (58.79) |
| 4 | CACO3 (2.0) |
| 5 | OM (2.18) |
| 6 | OM (1.76) |
| 7 | AWC (11.71) |
| 8 | CEC (4.560) |
| 9 | CACO3 (5.210) |
| 10 | RDEPTH (58.79) |
| 11 | Gypsum (3.0) |
| 12 | CEC (15.06) |
| 13 | AWC (8.39) |
| 14 | CLAY (29.43) |
| 15 | 126.83 Bu/Acre, 1.274 mil acre Area |
| 16 | 88.07 Bu/Acre, 0.1838 mil acre Area |
| 17 | 94.27 Bu/Acre, 0.360 mil acre Area |
| 18 | 96.64 Bu/Acre, 0.225 mil acre Area |
| 19 | 81.87 Bu/Acre, 0.393 mil acre Area |
| 20 | RDEPTH (45.79) |
| 21 | AWC (11.27) |
| 22 | BD (1.270) |
| 23 | PH (6.82) |

| 24 | CLAY (29.67) |
|---|---|
| 25 | 115.26 Bu/Acre, 4.139 mil acre Area |
| 26 | 92.82 Bu/Acre, 1.057 mil acre Area |
| 27 | CACO3 (0.72) |
| 28 | 113.17 Bu/Acre, 1.213 mil acre Area |
| 29 | 130.56 Bu/Acre, 2.633 mil acre Area |
| 40 | 106.37 Bu/Acre, 4.191 mil acre Area |
| 41 | 121.28 Bu/Acre, 4.605 mil acre Area |
| 42 | 118.23 Bu/Acre, 4.205 mil acre Area |
| 43 | 133.60 Bu/Acre, 3.046 mil acre Area |
| 44 | 92.67 Bu/Acre, 70 k acre Area |
| 45 | AWC (10.110) |
| 46 | 80.40 Bu/Acre, 1.142 mil acre Area |
| 47 | 69.60 Bu/Acre, 803 k acre Area |
| 48 | 106.56 Bu/Acre, 1.924 mil acre Area |
| 49 | 77.83 Bu/Acre, 5.089 mil acre Area |
| 54 | 99.08 Bu/Acre, 0.654 mil acre Area |
| 55 | 124.28 Bu/Acre, 1.332 mil acre Area |
| 90 | PH (6.590) |
| 91 | 98.12 Bu/Acre, 753 k acre Area |
| 180 | 108.73 Bu/Acre, 936 k acre Area |
| 181 | 89.5 Bu/Acre, 181 k acre Area |

| FIG. 30A | FIG. 30B |

METHOD AND SYSTEM OF EVALUATING PERFORMANCE OF A CROP

This is a continuation of U.S. application Ser. No. 10/744,307, filed on Dec. 23, 2003, which claims priority based on U.S. provisional application Ser. No. 60/444,592, filed Jan. 31, 2003, and entitled METHOD AND SYSTEM OF EVALUATING PERFORMANCE OF A CROP, under 35 U.S.C. 119(e).

FIELD OF THE INVENTION

This invention relates to a method and system for evaluating the performance of a crop with respect to one or more geographic areas associated with the crop.

BACKGROUND OF THE INVENTION

Modern agriculture presently involves developing new strains and varieties of plants that are insect resistant, herbicide resistant, drought tolerant, yield maximizing, or that possess other desirable properties. The new or existing varieties of crops may be obtained by cross-fertilization, hybridization, genetic modification or other scientific techniques. The seed developers may test the performance of the crops and underlying seeds at test sites. However, if the test sites are not representative of the environmental conditions of a particular grower's land or the intended planting site, the performance tests of the developer may not provide reliable or applicable test results. Further, the performance of the crop may depend on other factors besides the plant or seed genetic characteristics, such as environmental factors. Accordingly, a need exists for developing test sites that are representative of the relevant environmental factors of the intended market of growers. Further, a need exists for determining a preferential new variety of a crop between or among two or more varieties of crops based on a superior performance of the new variety.

SUMMARY OF THE INVENTION

A method and system of evaluating crop performance facilitates characterization of the environmental impact of a geographic region or areas within the region for growing plant-life. Environmental measurements are obtained. The environmental measurements are associated with a geographic region. Each environmental measurement includes at least one of soil data and weather data. Respective location data is obtained. The location data is associated with corresponding environmental measurements. An estimated performance characteristic is determined for a particular crop planted in the geographic region based on the obtained environmental measurements and respective location data. Contours are established for one or more uniform performance areas with generally uniform performance characteristics within the geographic region by applying a decision-tree analysis to the obtained environmental measurements.

BRIEF DESCRIPTION OF THE DRAWINGS

FIG. 1 is a block diagram of a crop evaluation system for collecting at least one of soil data, climate data, weather data, and performance data associated with an agricultural crop for a defined geographic area.

FIG. 2 is a block diagram of a crop evaluation system in which input devices communicate with a data processor via electromagnetic signals.

FIG. 9 is a chart that illustrates a soil model that may be used to classify and process soil data in any of the methods set forth herein.

FIG. 24 through FIG. 30B show various decision tree analyses for corn in various regions and illustrative average yield maps related thereto.

DESCRIPTION OF THE PREFERRED EMBODIMENT

Figure 3:
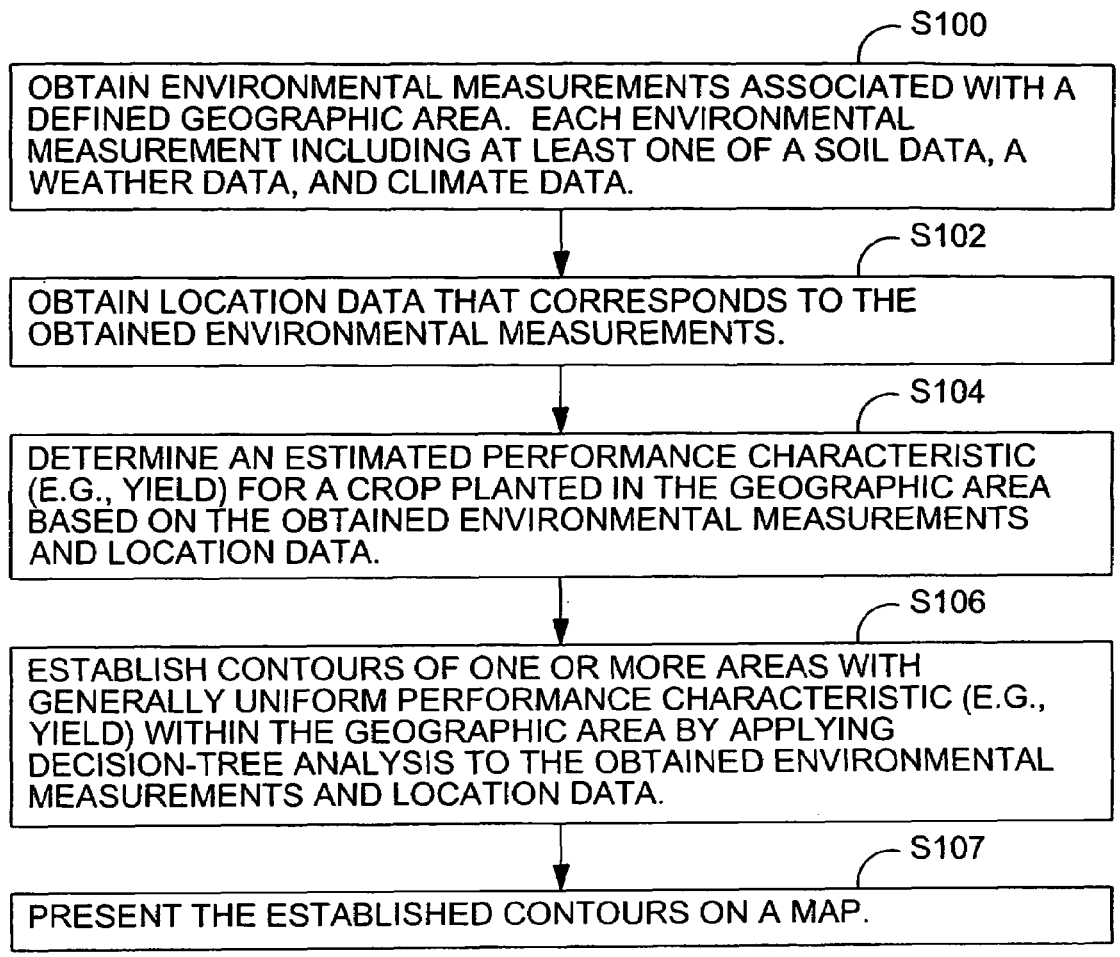
FIG. 3 is one embodiment of a method for evaluating the performance of a crop in accordance with the invention.

In accordance with one embodiment of the invention, FIG. 1 shows a crop evaluation system. The crop evaluation system includes one or more input devices 510 that provide input data to a data processor 512. Each input device 510 may communicate to the data processor 512 via a communications port 518 and a databus 516. A databus 516 may support communications between or among one or more of the following components: the data processor 512, one or more input devices 510, the data storage device 514, the communications port 518, and the display 520. A data storage device 514 may store input data inputted by any input device 510, processed data outputted by the data processor 512, or both. A display 520 or another output device may be used to present a graphical or textual, tabular output of the crop evaluation system to a user.

The input devices 510 comprise one or more of the following devices: a user interface 524 (e.g., a keyboard or keypad), a crop management input 526 (e.g., crop management sensors), a soil characteristic sensor 528, a weather sensor 530, a weather data 552 receiver 532, a location-determining receiver 534 (e.g., a Global Positioning System (GPS) receiver with or without differential correction), and a performance sensor 536 (e.g., yield sensor). The user interface 524 may allow a user to manually enter input data via a graphical user interface 524, a keyboard and a pointing device, a floppy disk drive, a magnetic storage medium, an optical storage medium or otherwise. Accordingly, the user interface 524 may be used to input data that is gathered by information service providers, soil surveyors, climatic databases, weather databases, governmental records, meteorological records, or other sources. The soil characteristic sensor 528 may be any sensor that is capable of detecting at least one of the soil factors and sub-factors associated with the Soil Rating for Plant Growth (SRPG) soil factors or their equivalents, for example. The weather sensor 530 may detect air temperature, ground temperature, hours of sunlight, precipitation per unit time, and other weather or climatic information. The weather data 552 receiver 532 may receive a data feed from a regional, local or national weather service that provides weather data 552. The location-determining receiver 534 may be co-located with one or more of the input devices 510 or sensors. For example, the location-determining receiver 534, the crop management input 526, the soil characteristic sensor 528, the weather sensor 530, and the performance sensor 536 may be mounted on a stationary sensing station or on a mobile agricultural machine.

The data storage device 514 may be used to store input data collected by the input devices 510. For example, the data storage device 514 may store historical yield data, yield data 548, soil data 550, and weather data 552. The stored input data may be accessed by the data processor 512 to estimate current performance (e.g., yield) based on previous or historical records.

The data processor 512 comprises a performance estimator 538, a mapper 540, and a data analyzer 542. The performance estimator 538 may estimate the current or prospective performance (e.g., average yield) of particular crop or variety of a particular crop in a defined geographic area based on historical yield data 546, soil data 550, climate data 544, and weather data 552 for the defined geographic area. The mapper 540 facilitates display 520 of the performance characteristic (e.g., average yield) of a particular crop in a defined geographic area in a graphical or tabular format for a user. The data analyzer 542 may use the crop evaluation provided by the performance estimator 538 to facilitate a business or marketing decision based on the crop evaluation.

The weather station 522 comprises weather sensing equipment 554 for gathering weather data 552 for a certain geographic location and a transmitter 556 for transmitting the weather data 552 and location data to a weather data 552 receiver 532 associated with the input devices 510.

In one embodiment, the input devices 510 comprise sensing devices for obtaining environmental measurements corresponding to test sites within a geographic region. A sensing device has one or more sensors for analyzing an environment of a plant or crop. Sensing devices may be disbursed throughout a field, mounted on mobile agricultural machines, or both for collecting environmental measurements. The environmental measurements may be associated with corresponding geographic locations or with a defined geographic area. Each environmental measurement includes at least one of soil data 550, weather data 552, and climate data 544. For instance, weather data 552 may include rainfall data, whereas climate data 544 may include growing degree days (GDD) data. Soil data 550 may be referenced to, or expressed in terms of, soil indices.

The crop inputs are measured for crop production and may be gathered by sensors associated with the agricultural equipment. The crop inputs may include one or more of the following: planting rate, fertility, planting date or row width, and may associate those variables with yield.

A performance estimator 538 determines an estimated performance for a crop planted in the geographic region based on the obtained environmental measurements. For example, the performance estimator 538 comprises a yield estimator for determining an average yield (e.g., bushels per acre) of the particular crop in a defined geographic area.

An evaluator 537 establishes contours of one or more areas with generally uniform performance level (e.g., generally uniform average yields) within the geographic region by applying decision-tree analysis to the obtained environmental measurements. The evaluator 537 applies a decision-tree analysis to determine critical environmental measurements associated with corresponding generally uniform performance ranges (e.g., generally uniform average yields) for the particular crop.

The mapper 540 facilitates the provision of a graphical representation or tabular, textual representation of the environmental measurements or data analysis for improved understanding. The mapper 540 may support assigning different colors or different shades to different geographic areas having distinct performance levels (e.g., average yields of a particular crop or variety of a particular crop). Further, the mapper 540 may support printing of a map or recording of a database file of performance levels by geographic location or provision of a database of locations, grower identifiers, and performance levels for particular varieties of crops.

The data analyzer 542 may be used to identify effective crop inputs and effective management techniques for improving the production of agricultural products. For example, the production of agricultural products may be carried out more economically, in less time, with a greater yield, or with a greater yield of defined characteristics (e.g., desired protein profiles). The response rate of each of the variables may be determined relative to product performance of the agricultural product. The data analyzer 542 may also be used to identify particular growers and producers that comply with preferential growing practices or enhanced crop inputs versus those that do not. Further, the data analyzer 542 may be used as a certification process to certify growers that use practices consistent with a certification for organic grower status or some other status that distinguishes the grower's ability or competence from other growers.

In one embodiment, the data analyzer 542 may provide a market share calculation. When transactional data (e.g., sales data) is incorporated, relative market shares can be calculated. Using the number of acres of crop by producer, a share of the market can be calculated. Producers can be classified by size, income, yield potential, and then the market of each segment assigned. A profile can be created using current customers as the base with the profile, and then projected to the universal market to determine market potential.

The data analyzer 542 may be used to provide one or more of the following types of analysis: (a) genetics performance by environment, (b) genetics by environment by management inputs, (c) product placement by customer, (d) product placement by trade area, and (e) market share calculation.

Genetics by environment is an analysis that links the environmental measurements or an environmental definition with product performance of an agricultural crop. Each particular agricultural product may be associated with a corresponding environmental definition. The environmental definition may apply to a certain defined geographic area within a geographic region. Historical and annual environmental data may be used for analysis. The performance of the particular crop may represent a yield or some other crop characteristic.

If different crops are grown in the same general environment with substantially similar or equivalent environmental definitions, the performance of the crops may be compared. For example, if a first genetically modified crop and a reference crop are grown in a defined geographic area consistent with the environmental definition, performance (e.g., superior yield or superior yield of a particular protein profile) of the first genetically modified crop may be determined with reference to the reference crop. The reference crop may be selected in accordance with various scenarios. Under a first scenario, the reference crop may represent the same type of crop as the first genetically modified crop. The product performance of the first genetically modified crop may be studied for variance in the regions with different environmental definitions to determine the influence of the environmental definition on crop performance. Under a second scenario, the reference crop represents the same type of crop as the first genetically modified crop, wherein the crops are grown in defined geographic areas with substantially similar environmental definitions to obtain a large sample size for judging the performance of the first genetically modified crop. Under a third scenario, the reference crop represents a second genetically modified crop that has been genetically modified for evaluative comparison with the first genetically modified crop to determine which genetically modified crop superiorly expresses a certain desired genetic trait or characteristic (e.g., yield per acre, disease resistance, drought resistance, or pest resistance). Under a fourth scenario, a first genetically modified crop is associated with a first competitor and the second genetically modified crop or reference crop is associated with a second competitor.

Each defined geographic area may be defined by a node that represents a geographic area. Each node has a node descriptor to distinguish that node from other nodes. Each node is associated with a benchmark or check yield for a corresponding particular agricultural product. The actual yield may differ from the benchmark or check yield for the particular agricultural product. Multiple agricultural products may be grown in each node and the actual performance (e.g., actual yield) of each agricultural product may be compared against a benchmark or check performance (e.g., check yield) for each node to identify a particular product with superior performance for that node.

Genetics by environment by management input considers environmental data and management input data of the grower as variables in determining crop performance of a particular variety of a crop.

Product placement by customer uses environmental data and product performance data to define a geographical area for a customer base for a particular crop or genetically modified crop. Here, the customer may represent a producer, grower, seed retailer, seed distributor or another person or business entity. The customers can be identified on a geographic basis or more specifically by compiling a list of potential or actual customer names and customer contact information (e.g., addresses or telephone numbers) in a geographic region from marketing databases, previous sales, publicly available governmental records, or other information sources. The compiled customer names may be associated with corresponding list of available or geographically suitable products, such as certain varieties of crops, seeds, plant stock or the like. A salesperson may call on the customers by using the compiled customer lists and associated products, such as genetically modified seed varieties that are well suited for the customer's geographic location based on performance tests. Further, a marketing representative may send marketing materials to the customers with products that are specifically tailored to the customer's growing needs.

Product placement by trade area involves determining an entire market or some portion of an entire market for a particular product based on the suitability of the particular product for the environmental conditions attendant with the geographic scope of the market. First, a product, such as a particular variety of crop or seed for the particular crop is defined. Second, a geographic market area is defined where the particular crop is estimated to provide suitable performance results based on testing or otherwise. Third, the arable or tillable land mass is determined within the geographic market area, and previous purchases of quantities of various products may be obtained where available. Fourth, an estimate of the overall market potential for the particular crop or seed for the particular crop is made.

Actual sales in the defined geographic market can be compared to estimated sales for the entire market to estimate market share and to assess how effective products are in a defined marketplace. When transactional data, such as sales data, is incorporated, relative market shares are readily determined. Using the number of acres of crop by producer, a share of the market can be calculated. Producers can be classified by size, income, yield potential, and then the market of each segment assigned. A profile can be created using current customers as the base with the profile and then projected to the universal market to determine market potential.

FIG. 2 shows a block diagram of another embodiment of a crop evaluation system. The crop evaluation system of FIG. 2 is similar to the crop evaluation system of FIG. 1, except the crop evaluation system of FIG. 2 includes wireless communications device 558s to support communications between one or more input devices 510 and a data processor 512. Wireless communications devices 558 may comprise radio frequency transceivers, a pair of transmitters 556 and a receiver, or other suitable electronics equipment. Like reference numbers in FIG. 1 and FIG. 2 indicate like elements.

FIG. 3 shows an illustrative method of characterizing an environment for growing plant-life. The method of FIG. 3 starts in step S100.

In step S100, environmental measurements are obtained. The environmental measurements may be obtained in accordance with various techniques that may be used alone or in combination with one another. Under a first technique, a mobile sensing system mounted on an agricultural machine (e.g., a tractor) takes environmental measurements. Under a second technique, a stationary sensing system (e.g., weather station 522) takes environmental measurements. Under a third technique, a receiver receives environmental measurements from a weather service or a weather data 552 feed. The environmental measurements are associated with a geographic region or a defined geographic area within the geographic region.

Each environmental measurement includes soil data 550, weather data 552, climate data 544 or any combination of the foregoing data. The soil data 550 comprises one or more of the following soil factor classifications: surface structure and nutrients, water features, toxicity, soil reaction, climate, physical profile, and landscape. The soil data 550 comprises one or more of the following factors: root depth, soil acidity, soil alkalinity, soil pH, water retaining capacity of soil, organic matter content, bulk density, clay content, available water capacity, sodium adsorption ratio, calcium carbonate content, gypsum content, cation-exchange capacity, shrink-swell cycle, shrink-swell attributes, gravel, cobble and stone content, soil porosity, soil structure, solid texture, biological activity, soil compaction, available water capacity, soil shrinkage, water table, permeability, salinity, moisture regime, temperature regime, moisture/temperature regime, physical root zone limitation, root zone available water capacity, slope, other soil phase features, ponding, degree of erosion, and flooding. The weather data 552 is selected from the group of measurements including any of the following: growing degree days, rainfall, rainfall range, temperature, temperature range, night-time temperature, day-time temperature, hours of sunlight, frost date, last spring frost, first fall or winter frost, soil temperature, air temperature, and humidity. The climate data 544 may comprise growing degree days and other historical or statistical data.

Although environmental data may be referenced to a reference site selected to be representative of a defined geographic area or region, the environmental data may be gathered on a local basis. In particular, soil data 550 may be collected and analyzed on a sub-field basis. For example, soil may be analyzed in plots of 10 feet by 30 feet.

Now that the soil data 550, weather data 552, and climate data 544 have been generally defined and discussed, various sources of the data are more fully explained.

The soil data 550 may be defined in accordance with a soil model called the Soil Rating for Plant Growth (SRPG), which is generally set forth in Sinclair, H. R., Jr., J. M. Scheyer, C. S. Hozhey, and D. S. Reed-Margetan, *Soil Rating for Plant Growth (SRPG), A System for Arraying Soils According to Their Inherent Productivity and Suitability for Crops* (USDA-NRCS, Soil Survey Division (1999)), incorporated by reference herein. The SRPG ranks the different soils for their inherent capacity to support crops. The SRPG is based on a series of factors. The factors may be weighted. Each of the factors may be plotted independently of the other factors on the geographic region of interest. The SRPG factors are classified in accordance with the following factor classifications: surface structure and nutrients, water features, toxicity, soil reaction, climate, physical profile, and landscape.

The surface structure and nutrient factors may comprise one or more of the following sub-factors: organic matter, bulk density, clay content, available water capacity, pH, sodium adsorption ratio, calcium carbonate, gypsum, cation-exchange capacity, shrink-swell, gravel/cobble, and stones. Bulk density refers to soil porosity, which depends upon soil structure, solid texture, organic matter, biological activity, shrink-swell, and compaction. The available water capacity addresses the capacity of the soil to store water in the surface layer that is available for plant use. Shrink-swell refers to the physical process of soil shrinkage during drying cycles and swelling during wet cycles. Gravel/cobble content may be measured by the rock and stones or fragments thereof that will pass through a sieve with certain defined opening sizes.

The water features factor may include one or more of the following sub-factors: water table, permeability, and available water capacity.

The toxicity factor represents detrimental chemical attributes and may contain one or more of the following sub-factors: sodium adsorption ratio (SAR), salinity, and cation-exchange capacity (CEC). The soil reaction factor may include soil pH as a sub-factor.

The climate factor may include one or more of the following sub-factors: moisture regime, temperature regime, and moisture/temperature regime. The physical profile factor may include one or more of the following sub-factors: physical root zone limitation, root zone available water capacity, and calcium carbonate.

The landscape factors include one or more of the following sub-factors: slope, other soil phase features, ponding, degree of erosion, and flooding.

The soil data 550 may be defined in alternative ways to the SRPG soil model.

For example, in the United States, soil data 550 may be available from the SGS (State Geography Survey). Alternatively, record or other soil models, agricultural or agronomic models may be used.

The climate data 544 includes historic climate data 544 (e.g., approximately 50 years of historic climate data 544). The climate data 544 may include precipitation rate, minimum temperature, and maximum temperature versus calendar day.

The weather data 552 or historic weather data 552 may be obtained from the National Oceanic Agency and Administration (NOAA). Historic weather data 552 is not live or real time data, but is generally delayed by some time period (e.g., three months). The weather data 552 is gathered from various climate stations.

In step S102, location data is obtained that corresponds to the obtained environmental measurements of step S100. Step S102 may take place before, during or after step S100. The environmental measurements may be associated with respective location data before, during or after the environmental measurements are obtained. In one embodiment, each environmental measurement is affiliated with corresponding location data that indicates an estimated or actual geographic location of the environmental measurement. The location data may be expressed in geographic coordinates, longitude and latitude or in accordance with another appropriate representation.

In one embodiment, the environmental measurements are associated with corresponding test sites defined by the location data. The test site may be defined in terms of geographic coordinates, longitude and latitude readings or the like. The test sites may be selected to be representative of a broader geographic area or region. In one embodiment, the defined geographic area may be defined to represent one or more agricultural test site(s). Agricultural test sites for new crops or genetically engineered crops may be compared to a general region of interest. The test environmental characteristics of a test site may be compared to the reference environmental characteristics of a general region to determine if the test environmental characteristics adequately mirror the reference environmental characteristics or if another test site would be more suitable.

In step S104, an evaluator 537 determines an estimated performance characteristic for a particular crop planted in the geographic region based on the obtained environmental measurements and respective location data. In one embodiment, the performance characteristic may comprise a yield of a particular crop, which may be expressed as a volumetric yield per land unit (e.g., bushel per acre) or a weight yield per land unit (e.g., metric ton per acre). The performance characteristic of the particular crop may be based on a genetic make-up of the particular crop and a growing environment for the particular crop.

In one embodiment, the performance characteristic may represent any of the following crop attributes: yield, oil content, protein content, protein profile, chemical content, a storage characteristic, a ripening characteristic, mold resistance, a genetic characteristic, a genetically modified attribute, an organically grown crop, an altered protein content, altered oil content, altered enzyme content, starch yields, amino acid content, size, weight, appearance, sugar content, perishability, storability, and preservability. The performance level of the performance characteristic may vary based on the growing location of the crop. The performance level (e.g., average yield in bushel per acre or otherwise) of the crop may be described in terms of geography.

In another embodiment, the performance characteristic may represent the performance level of a derivative product derived from an agricultural crop. For example, a derivative product may represent flour made from a grain crop or bread or buns baked from the flour. A processor, baker or miller may seek a certain performance level of a crop characteristic, such as starch content or dough water absorption. The processor may seek a performance analysis of the crops produced within some region associated with a processing plant. The dough lot water absorption is the amount of water a dough will hold, which can provide a measurable yield increase from the same amount of flour. The net result is that the bakery goods or buns can have a higher water content. Certain varieties of wheat or other grain may produce superior yields, baking or processing results because of dough water absorption.

In step S106, an evaluator 537 establishes contours in graphical, textual or tabular format of one or more uniform performance areas with generally uniform performance characteristic within the geographic region. For example, the generally uniform performance characteristic may represent a yield range or average yield range of a particular crop, which may be expressed as a volumetric yield per land unit or a weight per land unit. The generally uniform performance characteristic may be correlated with (a) the presence of a group of critical environmental measurement identifiers and (b) corresponding critical values or critical ranges associated with the critical environmental measurement identifiers. In graphical format, each established contour defines one or more continuous or discontinuous areas with generally uniform performance characteristics of the crop. In a tabular or textual format, each established contour may be stored in a file or another data structure that supports transformation to or output in the graphical format.

Step S106 may be carried out in accordance with several alternate approaches. Under a first technique, step S106 is executed pursuant to a two-step process. First, the evaluator 537 may apply a decision-tree analysis to the obtained environmental measurements. The decision-tree analysis may identify a statistical pattern of the critical environmental measurement identifiers and the associated critical values that generally accompany or that are correlated to the generally uniform performance characteristic. The critical environmental measurement identifiers and the associated critical values may be based upon performance tests or predictive models of performance of a particular crop. Second, the mapper 540 estimates contours of the generally uniform performance levels of the performance characteristic (e.g., yield) consistent with any identified statistical pattern and the location data associated with the critical environmental measurements identifiers.

Under a second technique for executing step S106, the contour may be established by applying a decision tree analysis to a data set of environmental data and performance data (e.g., performance test or performance model) applicable to a certain variety of a particular crop for a particular geographic region. For example, the contour may be established by applying a binary recursive portioning algorithm or a commercially available software tool for decision tree analysis. For example, the following are examples of commercially available decision tree software programs: Classification and Regression Tree (CART), Quick, Unbiased and Efficient Statistical Tree (Quest), Generalized, Unbiased, Interaction Detection and Estimation (Guide) and Classification Rule with Unbiased Interaction Selection and Estimation (Cruise). CART is a trademark of Salford Systems of San Diego, Calif. Quest is a decision tree algorithm with binary splits from nodes in the tree. Quest can be used for classification and data mining and was developed by Wei-Yin Loh of the University of Wisconsin and Yu-Shan Shih of the National Chung Cheng University, Taiwan. Guide is a regression tree algorithm developed by Wei-Yin Loh of the University of Wisconsin. Cruise is a statistical decision tree algorithm for classification and data mining developed by Hyunjoong Kim of the University of Tennessee and Wei-Yin Loh of the University of Wisconsin.

With respect to CART, the decision tree analysis may represent a classification/regression tree to identify different attributes associated with different corresponding performance levels (e.g., yields) for particular crops. The decision tree analysis has rules to determine when to split a parent node into child nodes of a tree when a tree is complete and how to assign a terminal node to an outcome or set of characteristics.

Each node on the decision tree is associated with a corresponding environmental characteristic and a corresponding critical condition or critical level for that environmental characteristic. A child node inherits the characteristics of parent nodes on the tree. A parent node is located above the child nodes as shown in the decision trees set forth in FIGS. 10 through 30B. The data analyzer 542 tries to pick heterogeneous populations to select child nodes or node splits for inclusion in the decision tree. CART finds a variable (e.g., an environmental characteristic) and a variable value that splits to groups with homogenous members. The decision tree analysis may first find a variable and then find a critical value for the variable.

The data evaluator 537 or data processor 512 seeks correlations between one or more environmental characteristics and a performance level of a particular crop. The data evaluator 537 or data processor 512 may determine what genetic traits or environmental characteristics are needed to make a particular variety of crop perform well or successfully in a region. The nodes represent variable values that are limiting factors in the performance of the crop. If one or more limiting factors are satisfied, the lowest level child nodes represent the performance level (e.g., yield) that stems from certain limiting factors as set forth in related (ancestral) parent nodes. From any node in FIG. 10 through FIG. 30B, the left fork is usually limiting or associated with a reduced performance level, while the right fork usually yields the best result in terms of enhanced performance level (e.g., average yield of a particular crop). The method and system may provide a performance level (e.g., yield) or results by location if test yield data 548 for a certain geographic area and representative crop (e.g., genetically similar to the crop to be predicted) is provided by a grower or a seed company, for example.

Under a third technique for executing step S106, a statistical parametric model is used to analyze trends in the data set, rather than a decision tree. The data set may represent environmental data, location data, and performance data (e.g., model performance data or representative test data) associated with a particular crop.

Under a fourth technique for executing step S106, the method and the system may use a cluster analysis algorithm instead of a multiple regression algorithm based on a decision tree. Attributes may be distributed across a geographic zone or standard within each geographic zone.

In step S107, the mapper 540 or output device presents the established contours on a map in graphical format, in a data file in textual format or in another output format. For the graphical format, the contours are represented by at least one of curved line segments, straight line segments, and any combination of the foregoing segments. In one example, the mapper 540 or graphical output device presents the established contours on a map wherein the contours are represented by different colors or different shading. In the graphical representation or map, the performance level (e.g., yield) within each geographic zone is generally homogeneous for corresponding environmental characteristics (e.g., average soil quality and average climate). For example, a geographic zone or contour and a respective yield may be associated with a number of growing degree days that are less than, or equal to, some threshold.

In step S107, the output may be provided to processors, growers, producers, purchasers, commodity brokers, traders, seed companies, developers, researchers, genetics companies or other customers. The customer may use the output to determine where to obtain a supply of a certain agricultural product at the lowest risk with the most uniform characteristics or with the most reliable yield from year to year. Further, the customer may use the output to determine which producers or growers provide superior results (e.g., greatest production efficiency) in a given environment or overall. In one embodiment, the output is expressed in a tabular format. In another embodiment, the output is expressed in a graphical format on a display 520 or printed out, for instance.

The method and system of FIG. 3 may be applied to any of the following applications: (1) variety evaluation of crop varieties, (2) producer ranking, and (3) crop preferred by geography. A separate yield map may be formed for each variety of a crop that is grown in a defined geographic area or region to foster a comparison of the performance of different varieties of crop. For example, the method and system may be readily applied to the evaluation of genetically modified crops to compare the performance of different genetically modified crops during a development phase of the crops or otherwise. A developer of genetically modified crops may use the method and system to account for factors other than the genetic make-up or genetic contribution crop performance.

A producer rating or ranking may be assigned based on the analysis of the method of FIG. 3. A processor may obtain ratings of producers within a certain radius (e.g., 75 mile radius) of a processing location, for example.

Particular varieties of crop may be more compatible with certain geographic regions than with others. A product analysis may evaluate a group of hybrids and determine how each hybrid performed. Product analysis may consider production area and life cycle management. The market analysis or portfolio analysis might provide a list of crops that are suitable for a corresponding defined geographic region. Producers and growers seek to reduce risk of growing crops and the variability of yields by selecting and growing crops that are suitable for their geographic region.

Seed companies and other providers may seek to sell or market seeds for agricultural products that perform best in a particular geographic regions or defined areas. The customer analysis may provide a seller or dealer with information on what the seller or dealer should sell at a particular location.

The locations of test sites may be selected to be representative of environmental, soil, weather, and climatic conditions associated with a larger region. The soil data 550 may be collected at a series of test sites within a geographic region. The site analysis may include a performance profile (e.g., a corn profile and a soybeans profile) applicable to certain classifications or types of crops. The method is used to identify comparable defined geographic areas with substantially similar environmental and soil conditions for seed and plant research and development activities.

Figure 4:
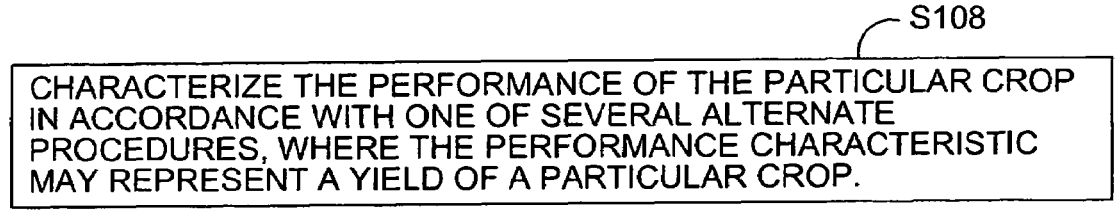
FIG. 4 is a procedure for characterizing the performance of a crop that may supplement the method of FIG. 3.

The method of FIG. 3 may optionally continue with the method illustrated in FIG. 4. The method of FIG. 4 begins in step S108, which may follow step S106 of FIG. 3.

In step S108, the evaluator 537 characterizes the performance of the particular crop in accordance with one of several alternate procedures, where the performance characteristic may represent a yield of a particular crop. Under a first procedure, the evaluator 537 establishes whether the particular grower is conforming or nonconforming with respect to the particular contour. The first procedure may be used to identify or spot effective growing or farming practices by evaluating and normalizing the yields of different growers of the substantially similar crops.

Under a second procedure, the evaluator 537 compares the yield of the particular crop with respect to a reference yield of a control group crop in the particular contour to determine if the particular crop is genetically superior to the control group crop. Although the particular crop may include any crop, in one example, the particular crop comprises any of the following: an organic crop, an organically grown vegetable, an organically grown fruit, number two yellow corn, high oil corn, high starch corn, waxy corn, highly fermentable corn, white corn, nutritionally-enhanced corn, pest-resistant corn, corn resistant to corn borer, herbicide resistant corn, non-genetically modified corn, genetically modified corn, high protein soybeans, high oil soybeans, large soybeans, non-genetically modified soybeans, and genetically modified soybeans. The user can test a new variety of crop and determine how the crop performed in comparison with a reference variety of the crop.

The methods of FIG. 3 and FIG. 4 have various practical applications to agriculture and farming. The methods may be used for growers to select particular varieties of crop that are well suited to growing in a defined geographic area. The grower can determine whether the weather is generally normal or whether it deviates from average, mean or mode values of weather data 552 to engage in irrigation or other mitigating practices. The methods may be used for seed suppliers to select particular varieties of crop that are well suited for marketing to growers of a defined geographic area. The method and system can help quantify a market size for a new product (e.g., a new variety of seed).

The evaluator 537 identifies contours associated with specific corresponding environmental characteristics. One or more growers may allocate geographic growing areas within the identified contours for growing of a corresponding particular crop during a prospective growing season. Similarly, one or more seed providers may market the growers within the identified contours for marketing of seeds for particular varieties of crops that are well suited for the geographic growing area. For example, the soil data 550 comprise a preferential soil nutrient profile that is suited for growing the particular crop.

Accordingly, developers, seed companies, researchers, and agricultural businesses can evaluate the performance of crops and the potential market for crops based on the environmental definitions for defined geographic areas and regions. The seed companies can tailor the development and marketing of agricultural products (e.g., seeds, crops, and plants) to the environmental definitions, which to some extent, represent the market for those agricultural products. Further, a developer can determine the market potential for each agricultural product by environment and against the competitive offerings. The environmental definitions may be defined for a particular duration (e.g., over one year or over multiple years). Each agricultural product may be assigned a corresponding sales value for a market that is defined by one or more suitable defined geographic areas (e.g., the total suitable tillable acreage) that have suitable environmental definitions for a corresponding agricultural product.

Figure 5:
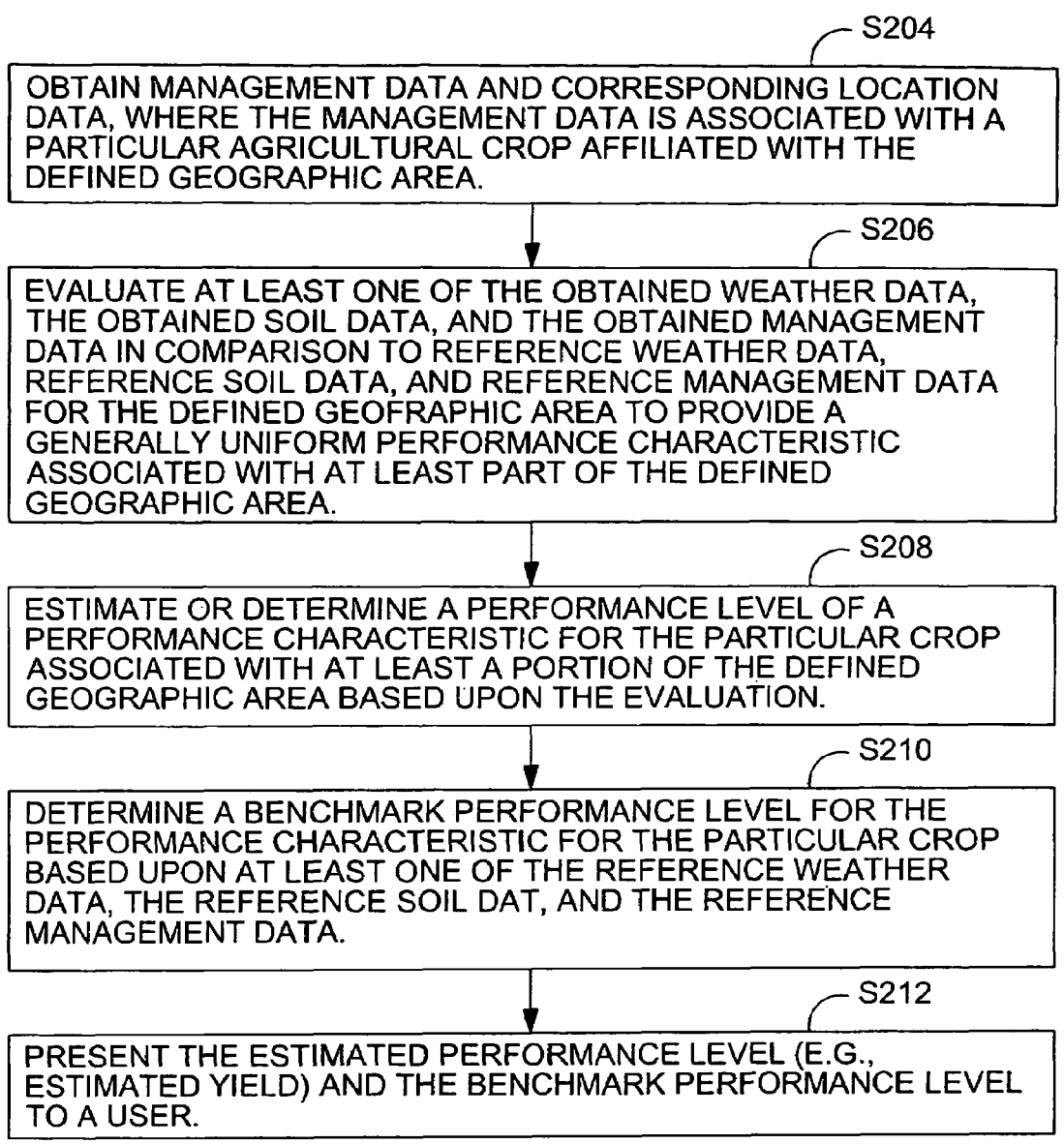
FIG. 5 is an alternate embodiment of a method for evaluating the performance of a crop.

FIG. 5 is a method of evaluating the performance of an agricultural crop. The method of FIG. 5 begins in step S200.

In step S200, weather data and corresponding location data is obtained for a defined geographic area. The weather data comprises at least one of growing degree days, climate data, temperature data, relative humidity data, precipitation data, sunlight data, and temporal measurements associated with the weather data. Under a first example, the weather data is obtained from one or more remotely situated weather stations in or near the defined geographic area. Under a second example, the weather data is received from a regional weather station. In one example, the defined geographic area comprises a sub-field unit having an area of approximately equal to or less than 300 square feet.

In step S202, soil data and corresponding location data are obtained for the defined geographic area. In one example, the soil data comprises a soil type, a soil potential, and nutrient availability. In another example, the soil data is derived from analyzing soil samples in the defined geographic area.

In step S204, management data and corresponding location data is obtained where the management data is associated with a particular agricultural crop affiliated with the defined geographic area.

In step S206, the evaluator evaluates at least one of the obtained weather data, the obtained soil data, and the obtained management data in comparison to reference weather data, reference soil data, and reference management data for the defined geographic area to provide a generally uniform performance characteristic associated with at least part of the defined geographic area. The evaluator classifies at least one of the obtained weather data, the obtained soil data, and the obtained management data with reference to corresponding critical attributes and associated critical attribute values of the reference weather data, reference soil data, and reference management data.

The evaluator supports the presentation or display of a generally uniform performance characteristic for a corresponding part of the defined geographic area to the user in accordance with one or more illustrative examples. In a first example, the performance level for the at least one portion of the geographic area is represented by a distinct shade or color on a geographic map to distinguish the performance level from other performance levels near, or adjacent to, the at least one portion. In a second example, the yield map for a particular crop includes the geographic, political boundaries, such as county lines, country borders, city boundaries, city locations, routes, roads, rivers, and other geographic features. In a third example, an estimated yield of the particular crop is expressed in at least one of a graphical format and a tabular format.

In step S208, a performance estimator estimates or determines a performance level of a performance characteristic for the particular crop associated with at least a portion of the defined geographic area based upon the evaluation. The performance characteristic comprises a measure selected from the following group: a starch yield, a protein content yield, an amino acid yield, an oil content yield, a protein profile yield, a volumetric yield per land unit, a weight yield per land unit, and bushel per acre yield for the particular crop associated with a defined geographic area. In one example, the performance estimator prepares yield maps for different varieties of the particular crop for the defined geographic area.

Following step S208 in step S210, a benchmark performance level is determined for the performance characteristic for the particular crop based upon at least one of the reference weather data, the reference soil data, and the reference management data.

In step S212, the determined estimated performance level (e.g., estimated yield) and the determined benchmark performance level are presented or displayed to a user.

Figure 6:
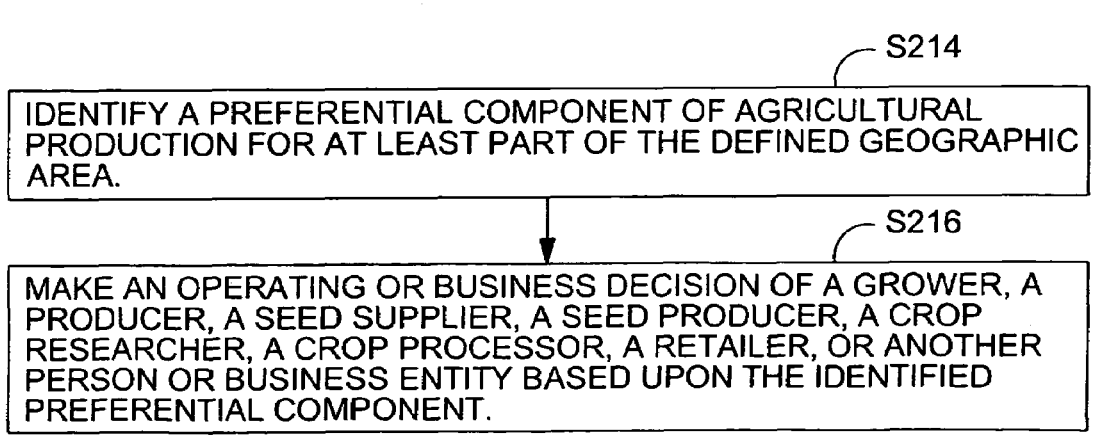
FIG. 6 is a method for making an operating decision of a grower, or a business decision of another, based on a crop evaluation.

FIG. 6 shows a method for providing crop consulting through an evaluation of crop performance. The method of FIG. 6 may follow, or be executed in conjunction with, the method of FIG. 5.

In step S214, a data processor identifies a preferential component of agricultural production for at least part of the defined geographic area. The preferential component may comprise one or more of the following: a preferential variety of a particular crop, a preferential grower for growing a particular crop, a preferential growing location for growing a particular crop or a variety of crop.

Step S214 may be carried out in accordance with one or more of the following procedures. Under a first procedure, a data processor identifies one or more preferential varieties of the particular crop based on yields of the different varieties indicated in the prepared yield maps. Under a second procedure, a data processor identifies a producer having a greater yield than a benchmark yield for a particular crop within a geographic region. Further, the data processor may provide an identity of the identified producer to a processor or potential buyer of the particular crop. Under a third procedure, a data processor identifies a designated geographic area within a region. The designated geographic area has a greater yield than a benchmark yield for a particular crop during a particular growing season. Further, the data processor may facilitate providing an identity of the designated geographic area to a processor or potential buyer of the particular crop.

In step S216, one or more of the identified preferential components of step S214 may be used to make an operating or business decision of a grower, a producer, a seed supplier, a seed producer, a crop researcher, a crop processor, a retailer, or another person or business entity. With respect to one grower operating decision or business decision, the data processor prospectively allocates the defined geographic area for a particular crop for a growing season to match an estimated demand for the particular crop prior to the growing season.

With respect to another grower operating decision or business decision, a data processor recommends later management data to a producer based on at least one of previous management data, current and previous weather data, and current and previous soil data to improve the estimated yield of the particular crop. With respect to a seed supplier business decision, a data processor identifies a geographic marketing opportunity for certain seeds for the particular crop. The geographic marketing opportunity pertains to one or more producers associated with a defined geographic area, where the certain seeds perform better than a benchmark yield level in the defined geographic area.

Figure 7:
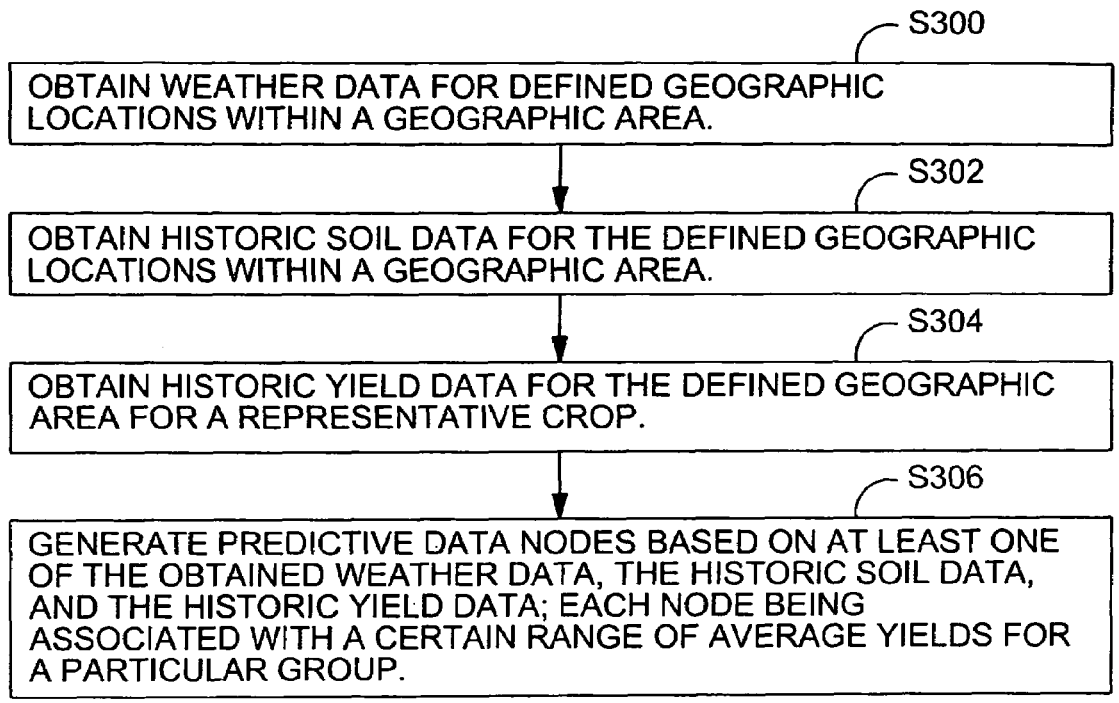
FIG. 7 is an alternate embodiment of a method for evaluating the performance of a crop.

FIG. 7 is a method for determining a performance of a crop. The method of FIG. 7 begins in step S300.

In step S300, weather data is obtained for defined geographic locations within a geographic area. In one example, the weather data comprises historical weather data. In another example, the weather data comprises historical weather data from NOAA (National Oceanic Agency and Administration).

In step S302, historic soil data is obtained for the defined geographic locations within a geographic area. In one example, the soil data comprises a plurality of soil factors associated with the Soil Rating for Plant Growth (SRPG) soil model. The soil data comprises soil measurements associated with location data.

In step S304, historic yield data is obtained for the defined geographic area for a representative crop.

In step S306, predictive data nodes are generated nodes based on at least one of the obtained weather data, the historical soil data, and the historical yield data, with each node being associated with a certain range of average yields for a particular crop. In one example, the nodes are generated based on yield data for a derivative product of the crop. In another example, the nodes are generated based on yield data for a baked good derived from the crop.

For instance, the crop may be milled to produce a flour as a derivative product, wherein the composition of the flour is selected to maximize a yield of a baked good derived from the crop.

Figure 8:
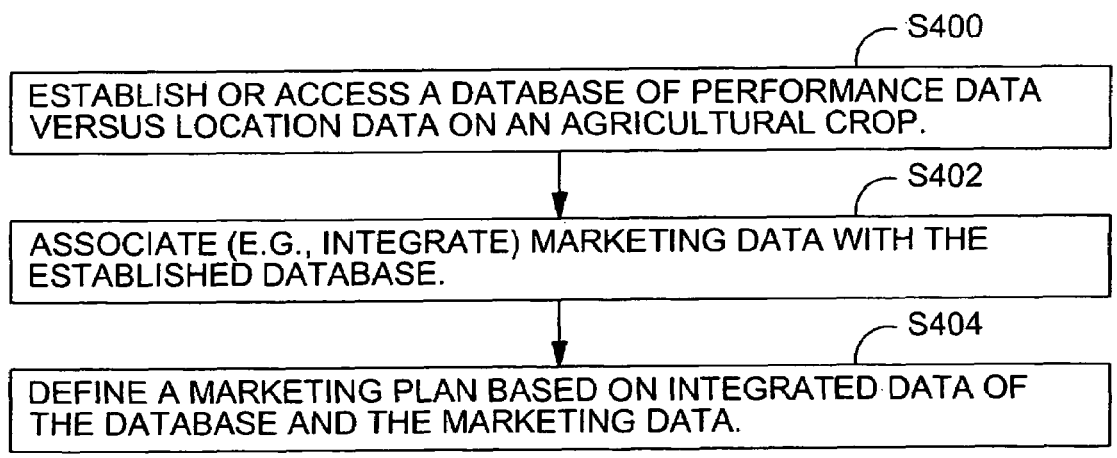
FIG. 8 is a method for marketing based on a crop evaluation.
Figure 10:
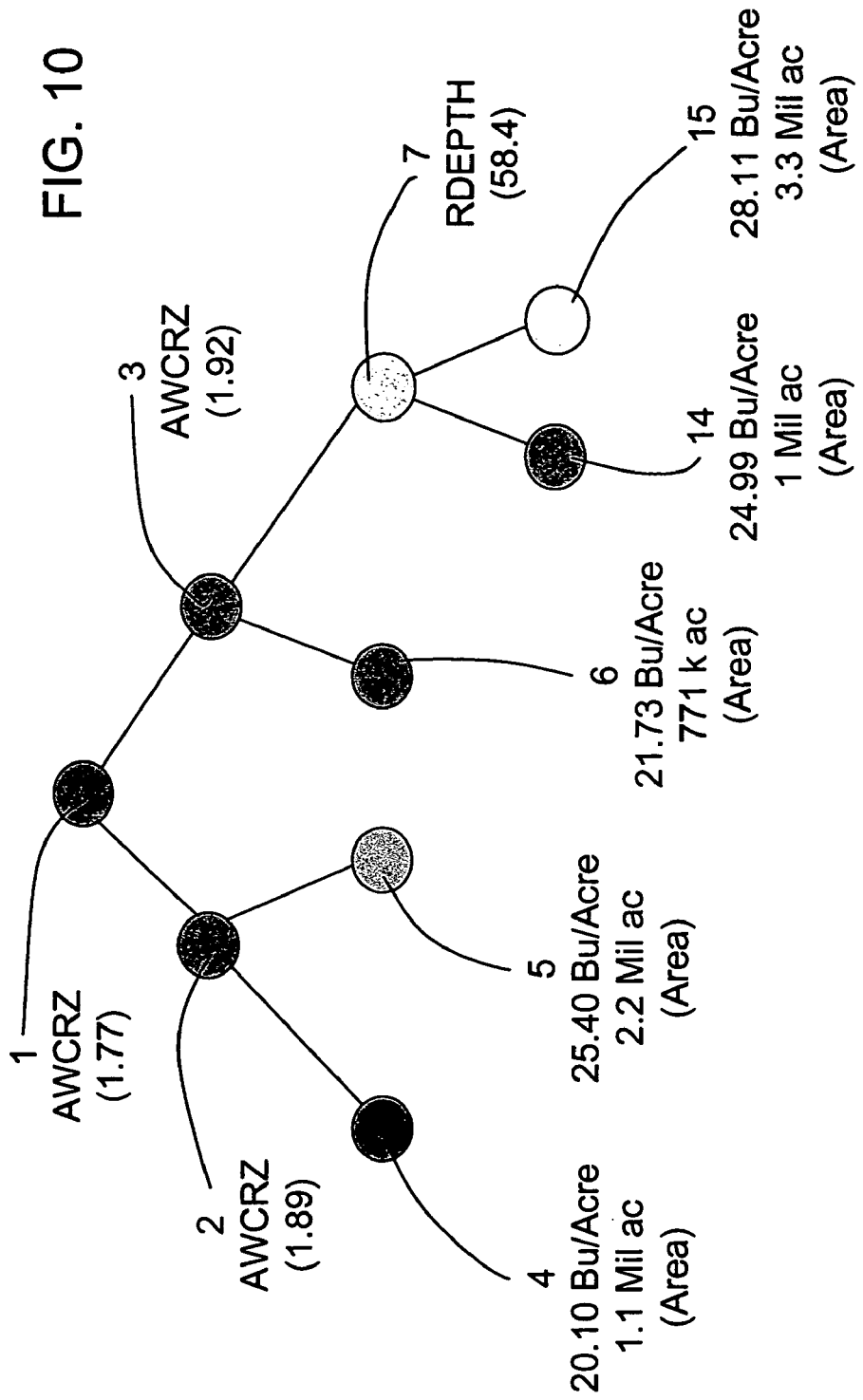
FIG. 10 is an illustrative decision tree analysis for soybeans as a crop in region F.
Figure 11:
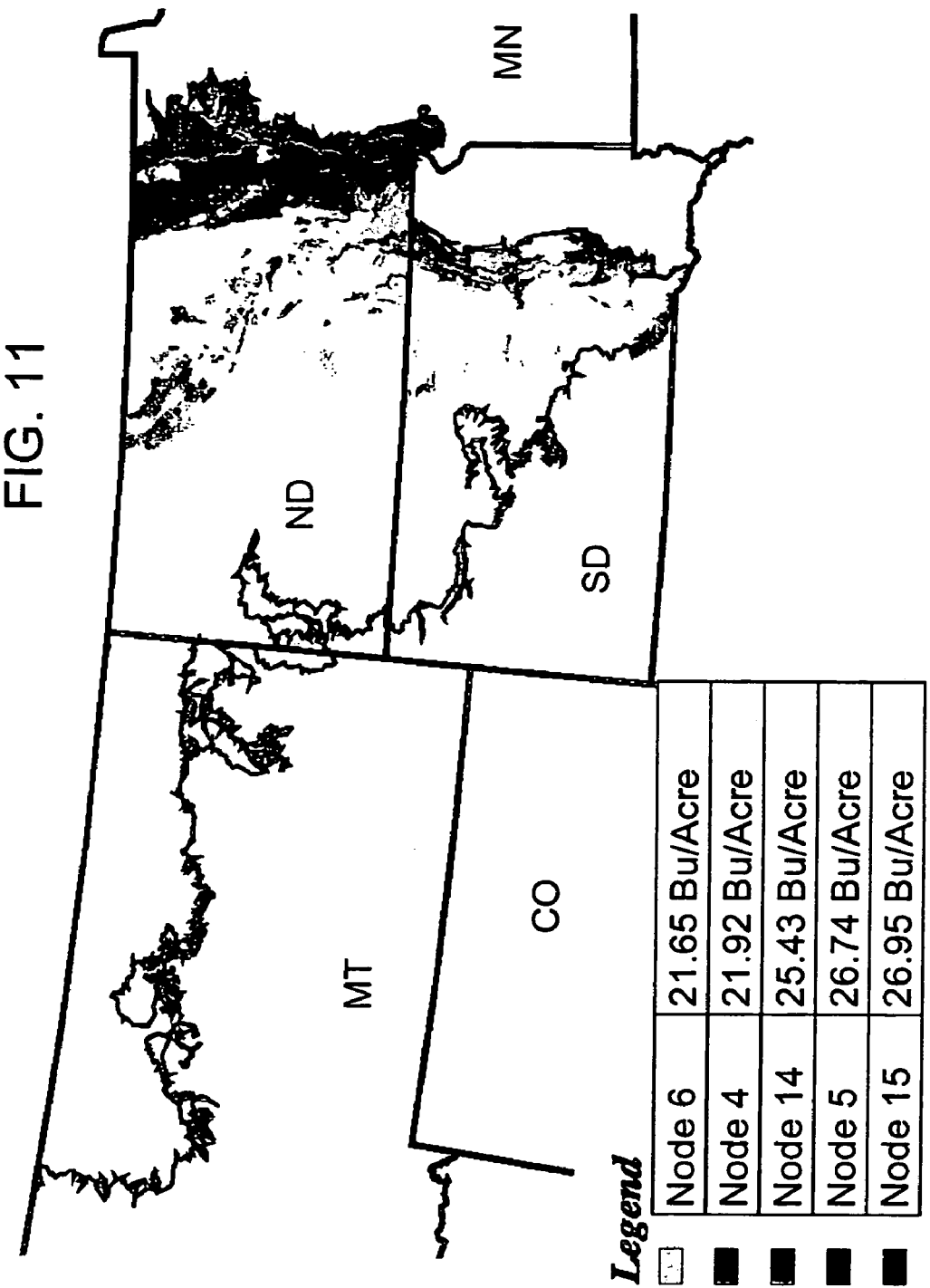
FIG. 11 is an illustrative map, of average yield contours in region F, which is consistent with the decision tree analysis of FIG. 10.
Figure 12:
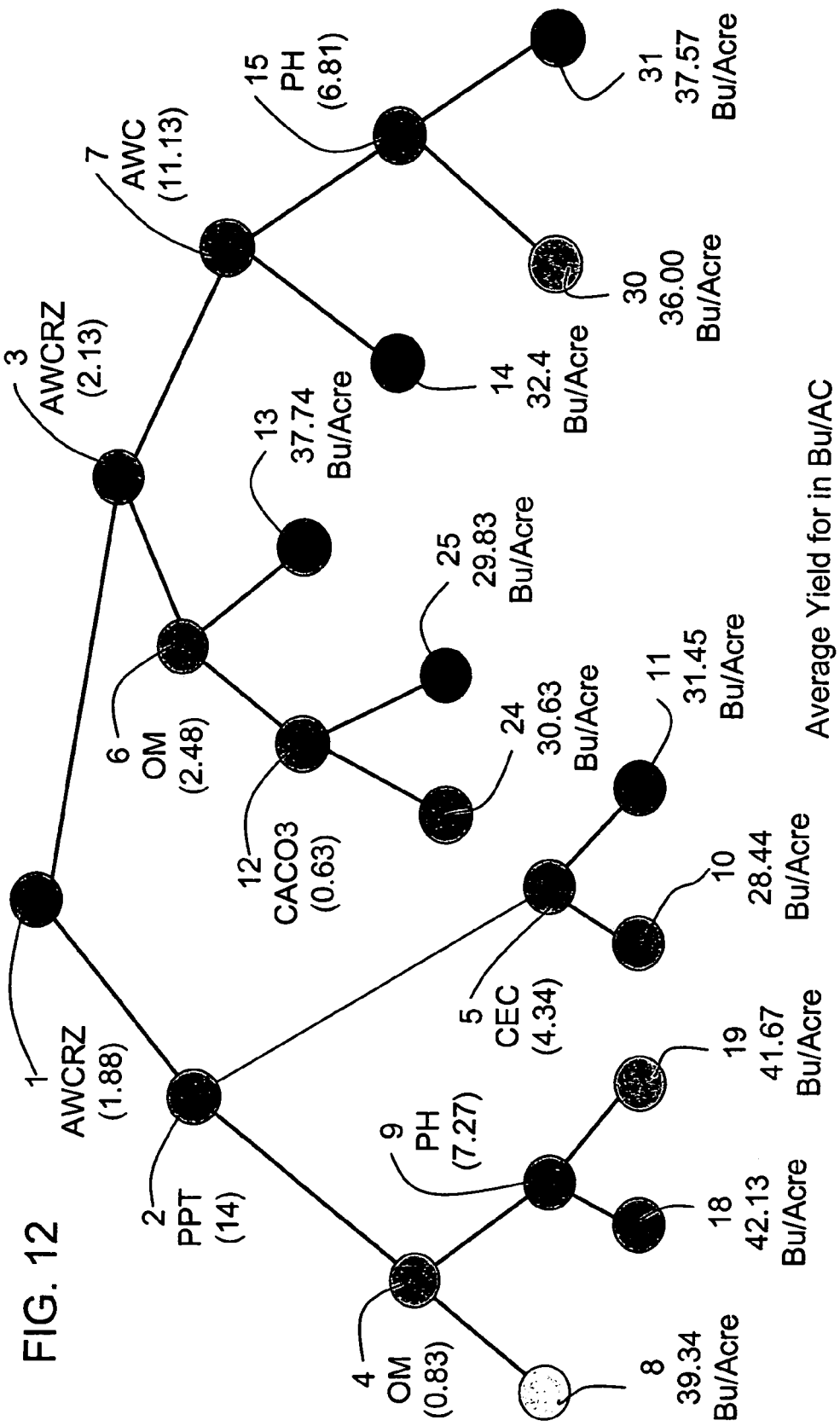
FIG. 12 is an illustrative decision tree analysis for soybeans as a crop in region H.
Figure 13:
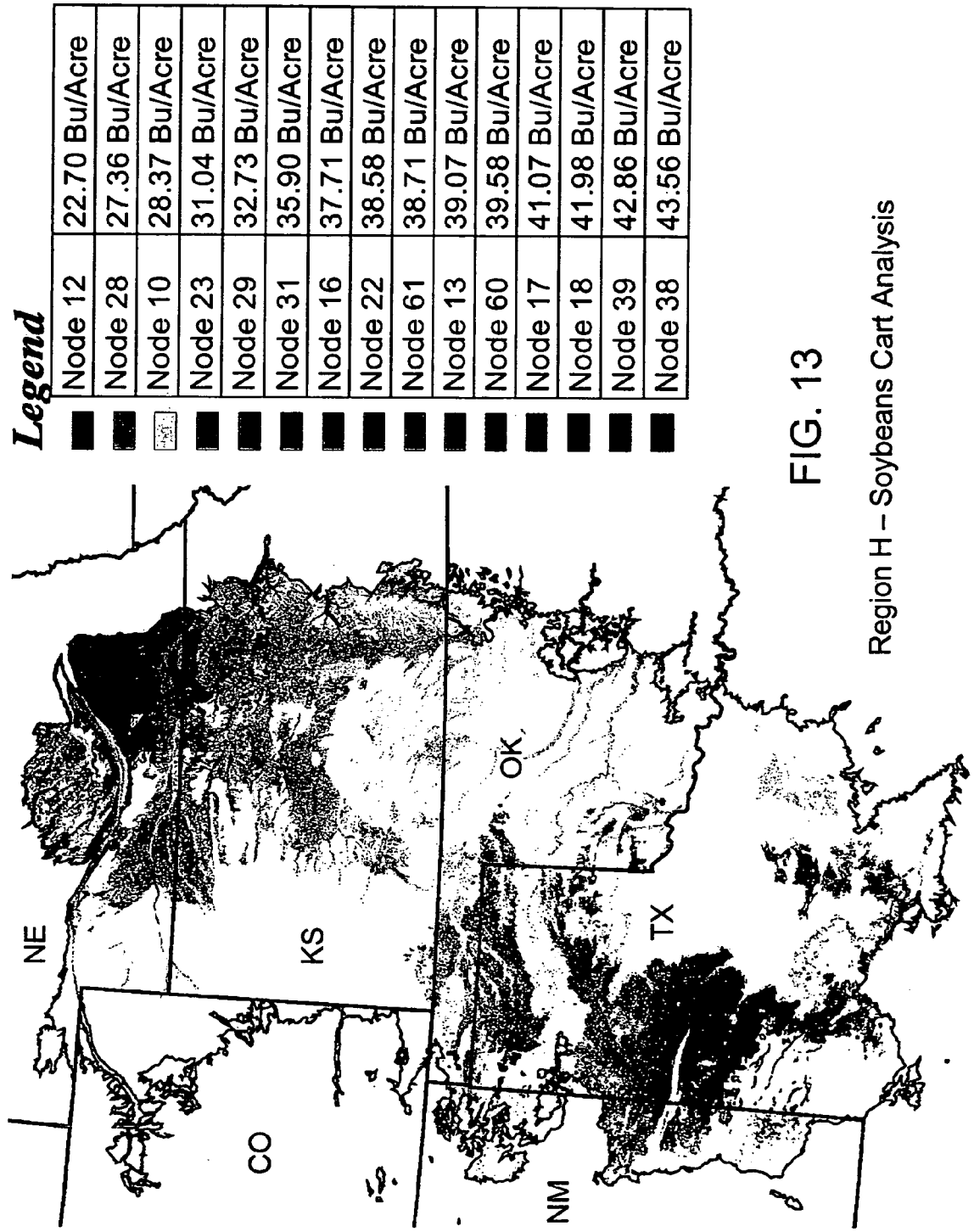
FIG. 13 is an illustrative map, of average yield contours in region H, which is consistent with the decision tree analysis of FIG. 12.
Figure 14:
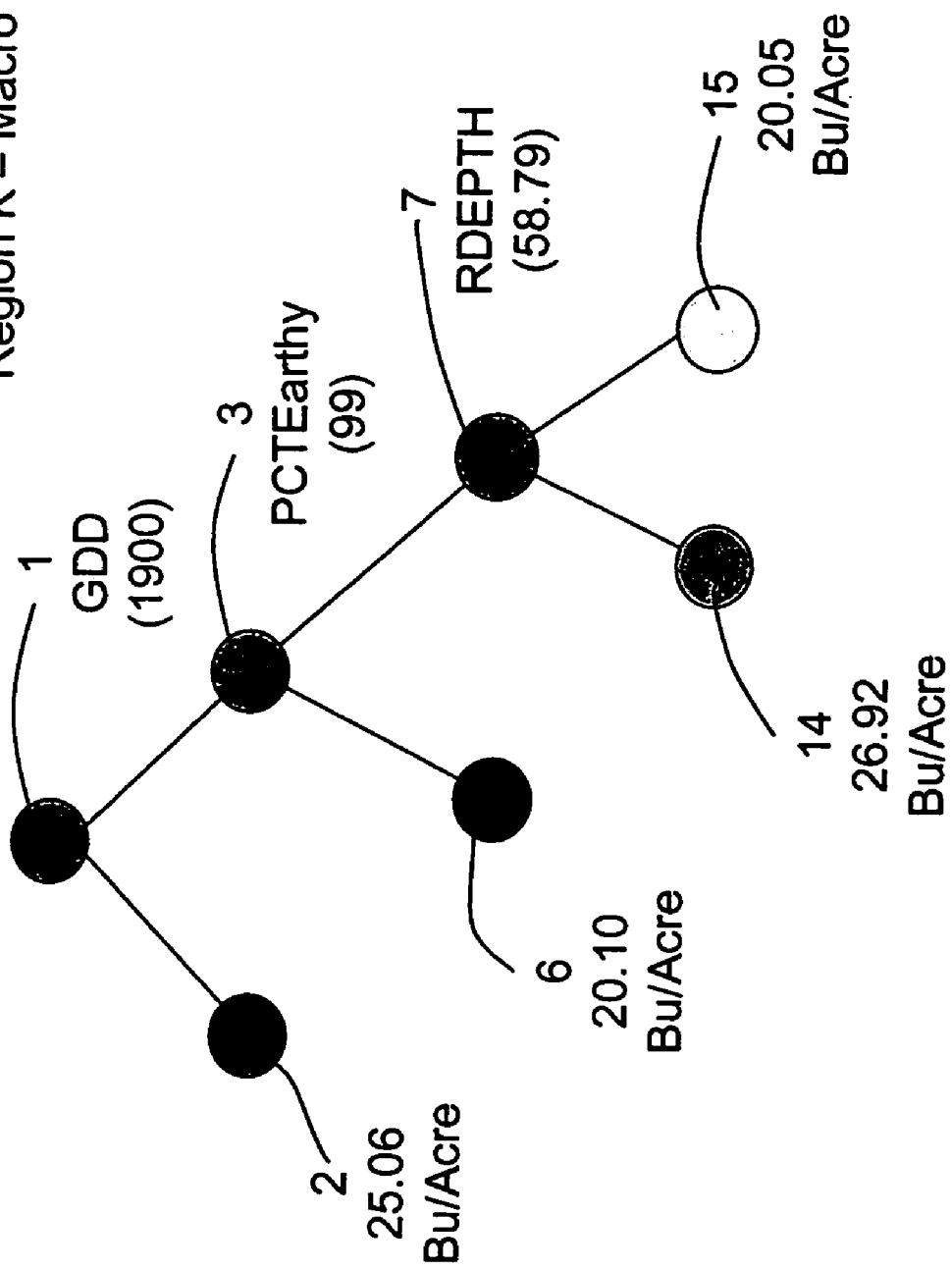
FIG. 14 is an illustrative decision tree analysis for soybeans as a crop in region K.
Figure 15:
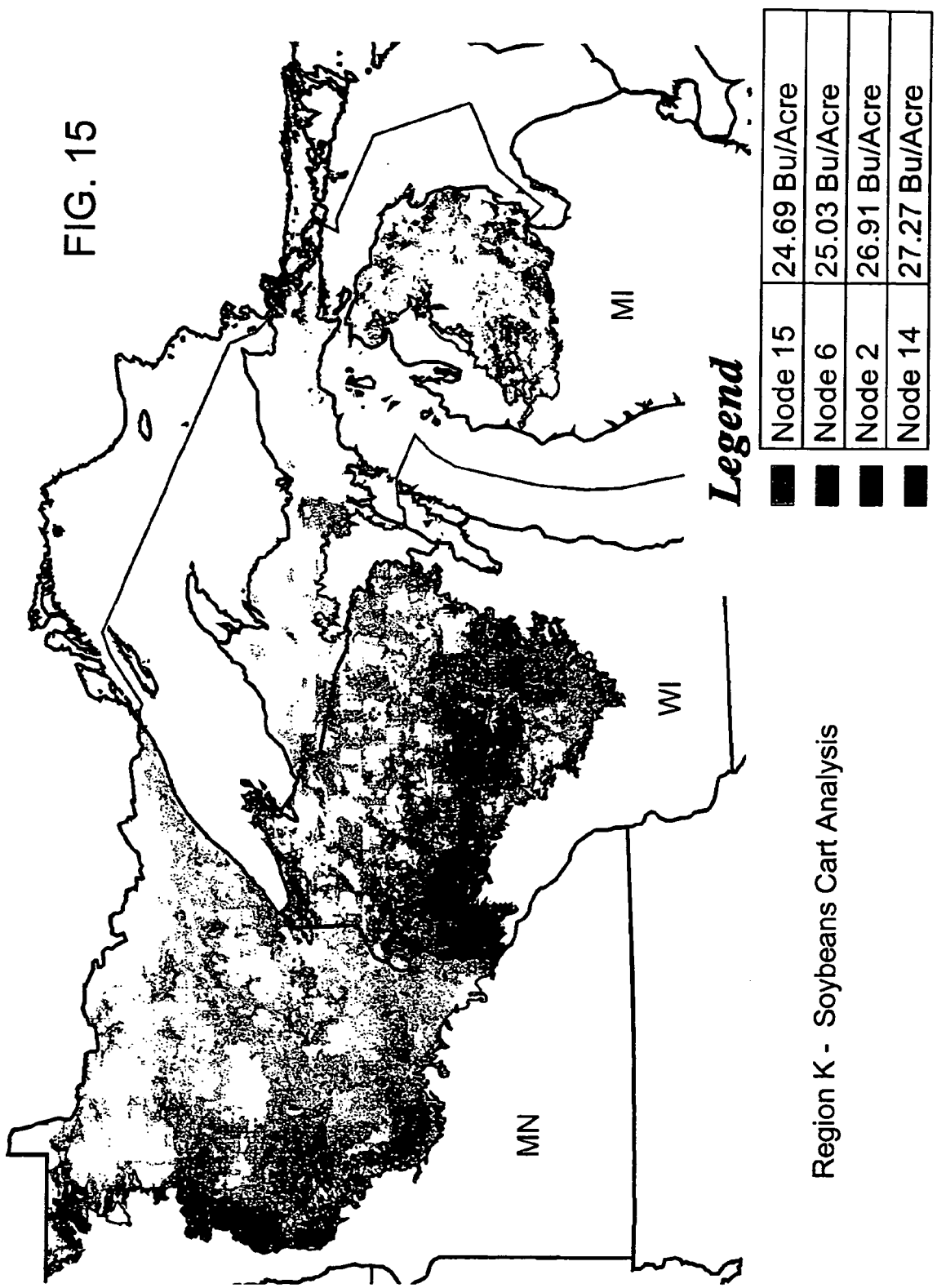
FIG. 15 is an illustrative map, of average yield contours in region K, which is consistent with the decision tree analysis of FIG. 14.
Figure 16:
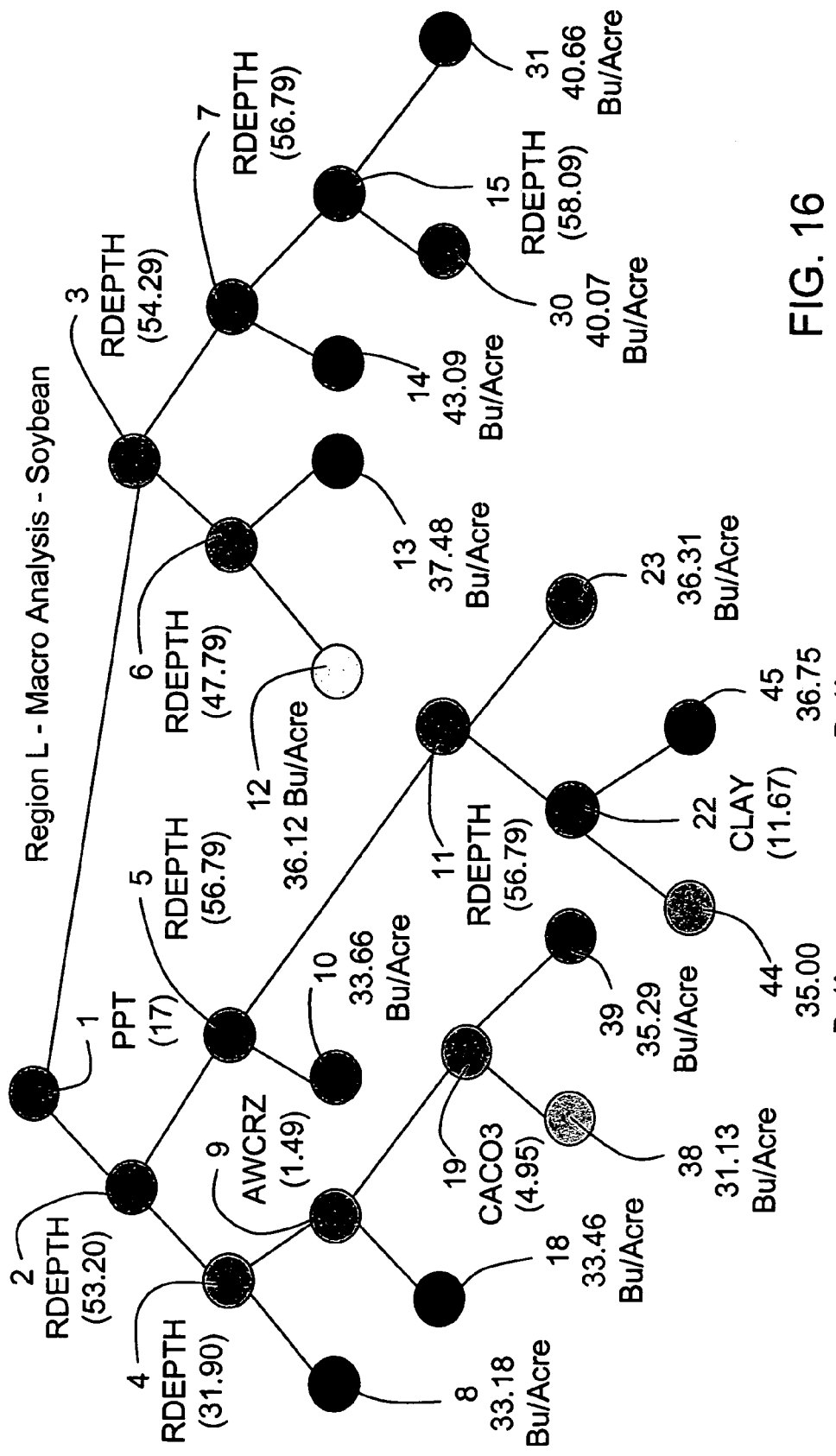
FIG. 16 is an illustrative decision tree analysis for soybeans as a crop in region L.
Figure 17:
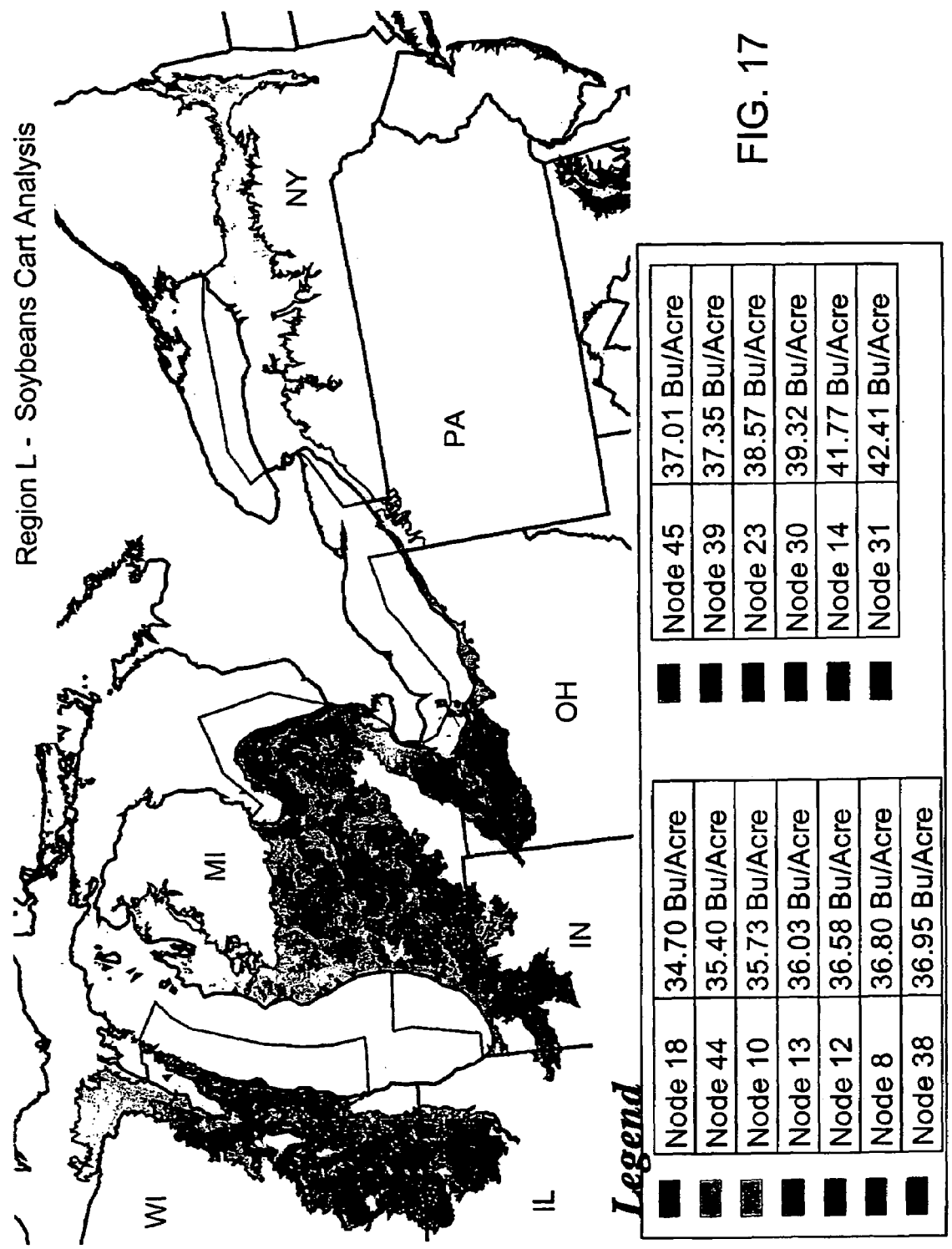
FIG. 17 is an illustrative map, of average yield contours in region L, which is consistent with the decision tree analysis of FIG. 16.
Figures 18, 18A:
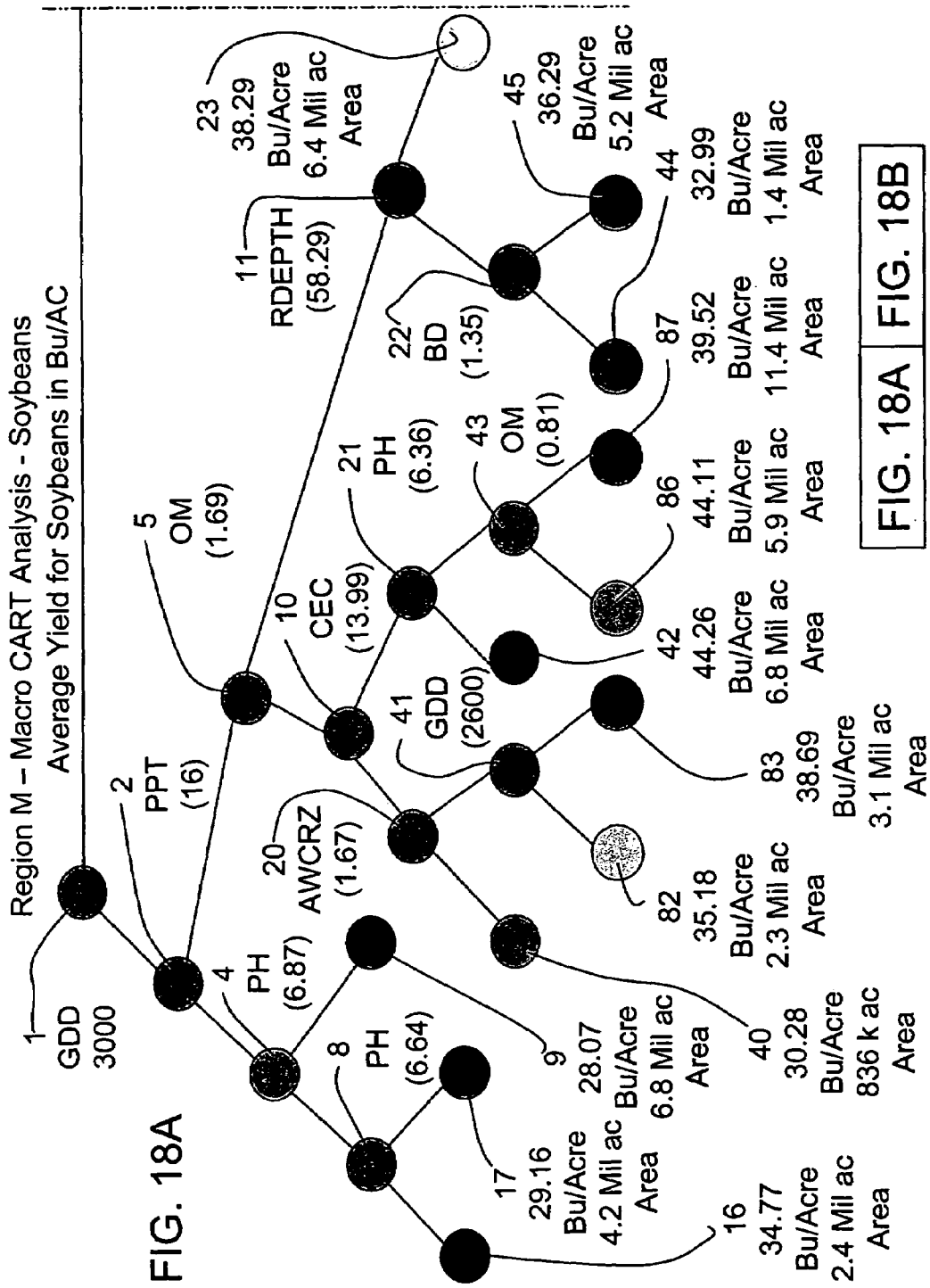
FIG. 18A and FIG. 18B are an illustrative decision tree analysis for soybeans as a crop in region M.
Figure 18B:
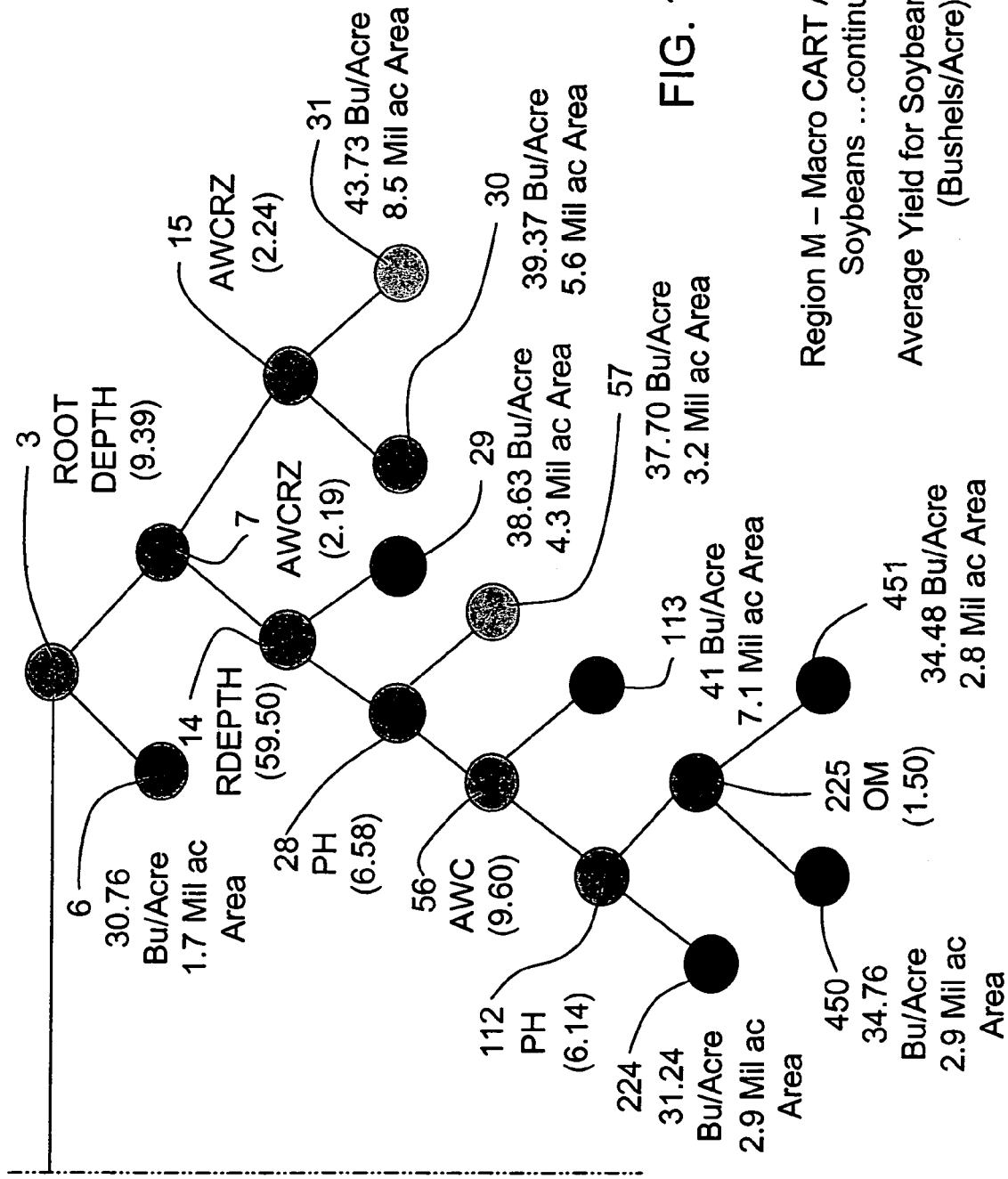
Figure 19:
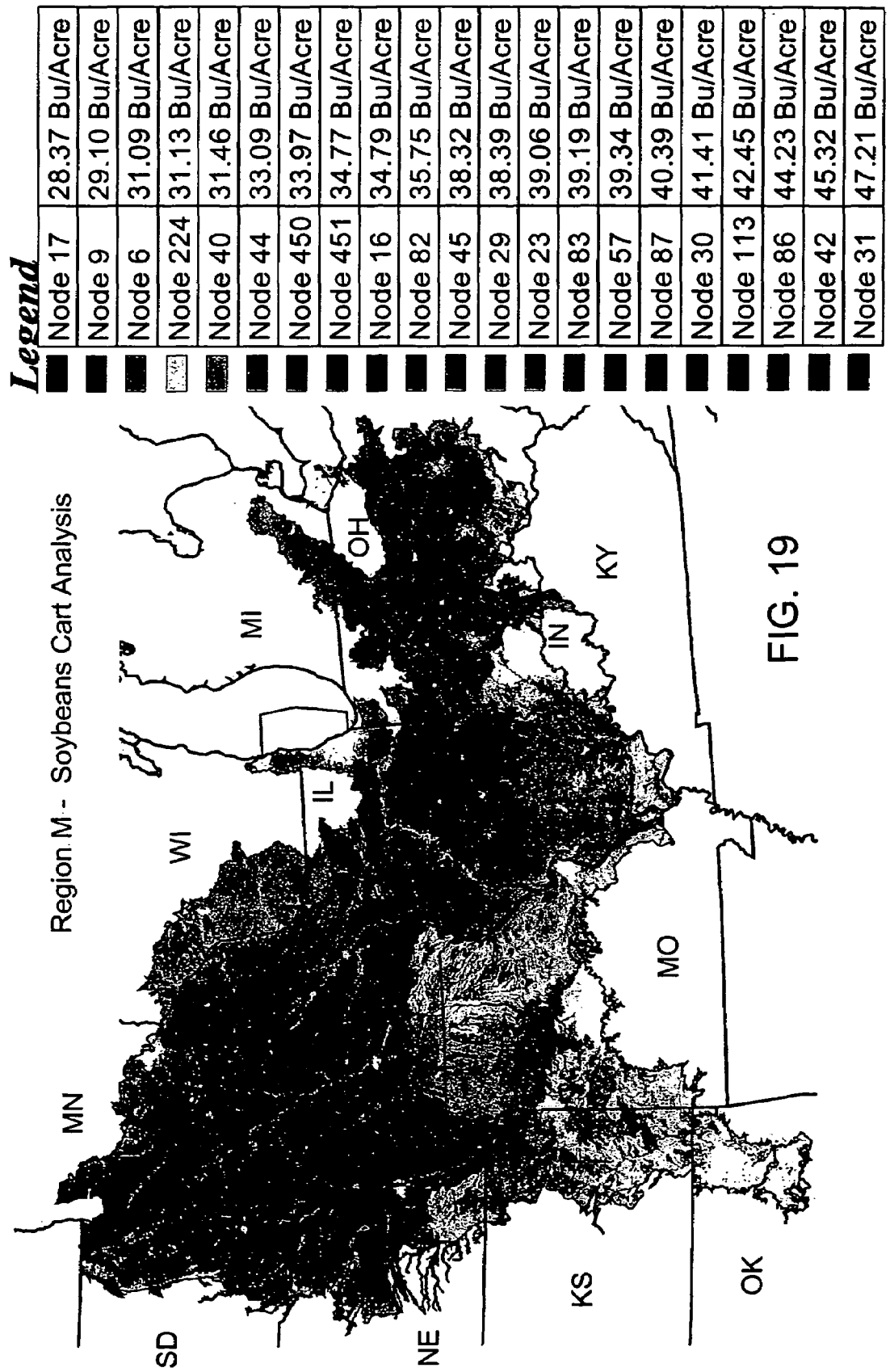
FIG. 19 is an illustrative map, of average yield contours in region M, which is consistent with the decision tree analysis of FIG. 18A and FIG. 18B.
Figure 20:
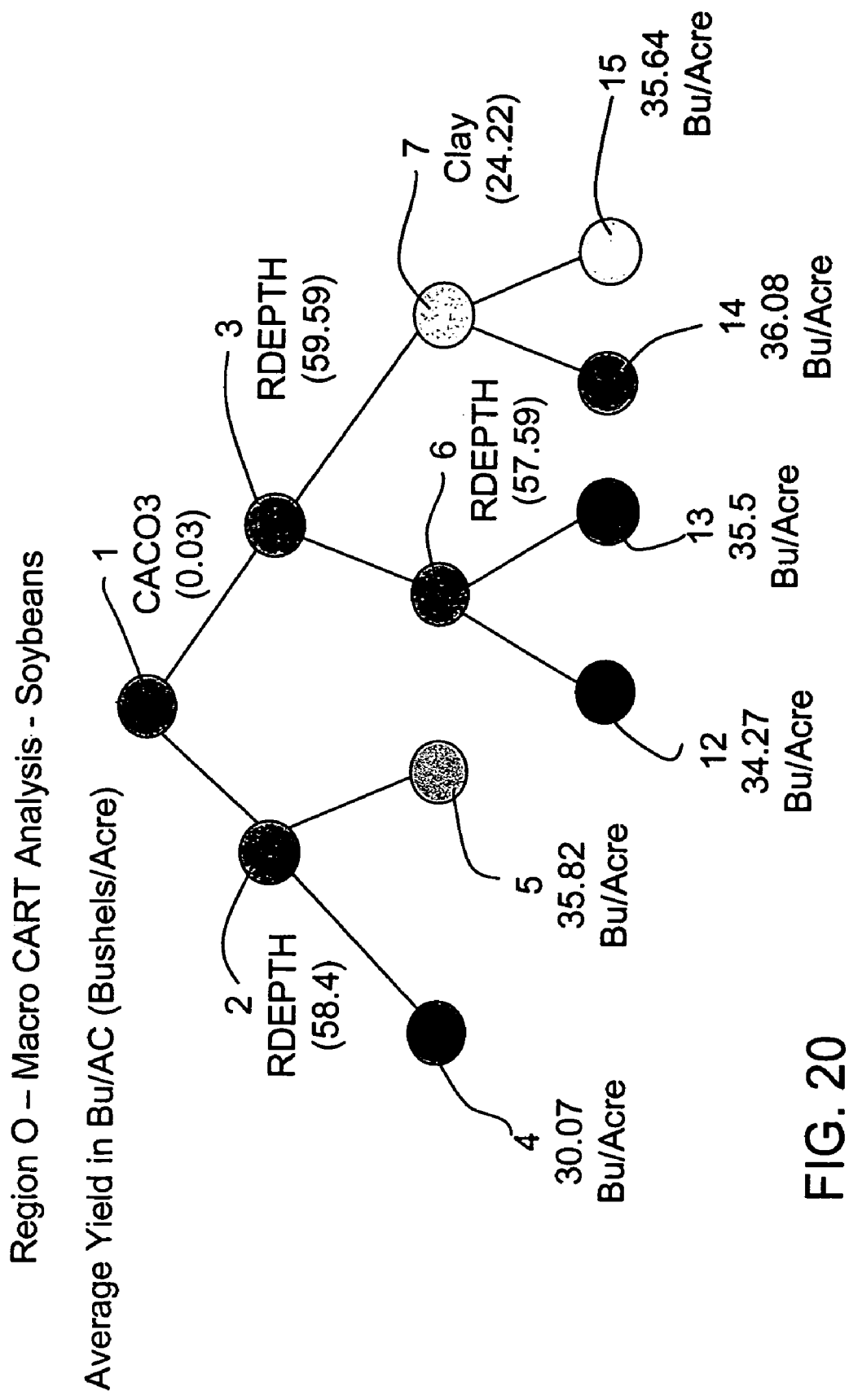
FIG. 20 is an illustrative decision tree analysis for soybeans as a crop in region O.
Figure 21:
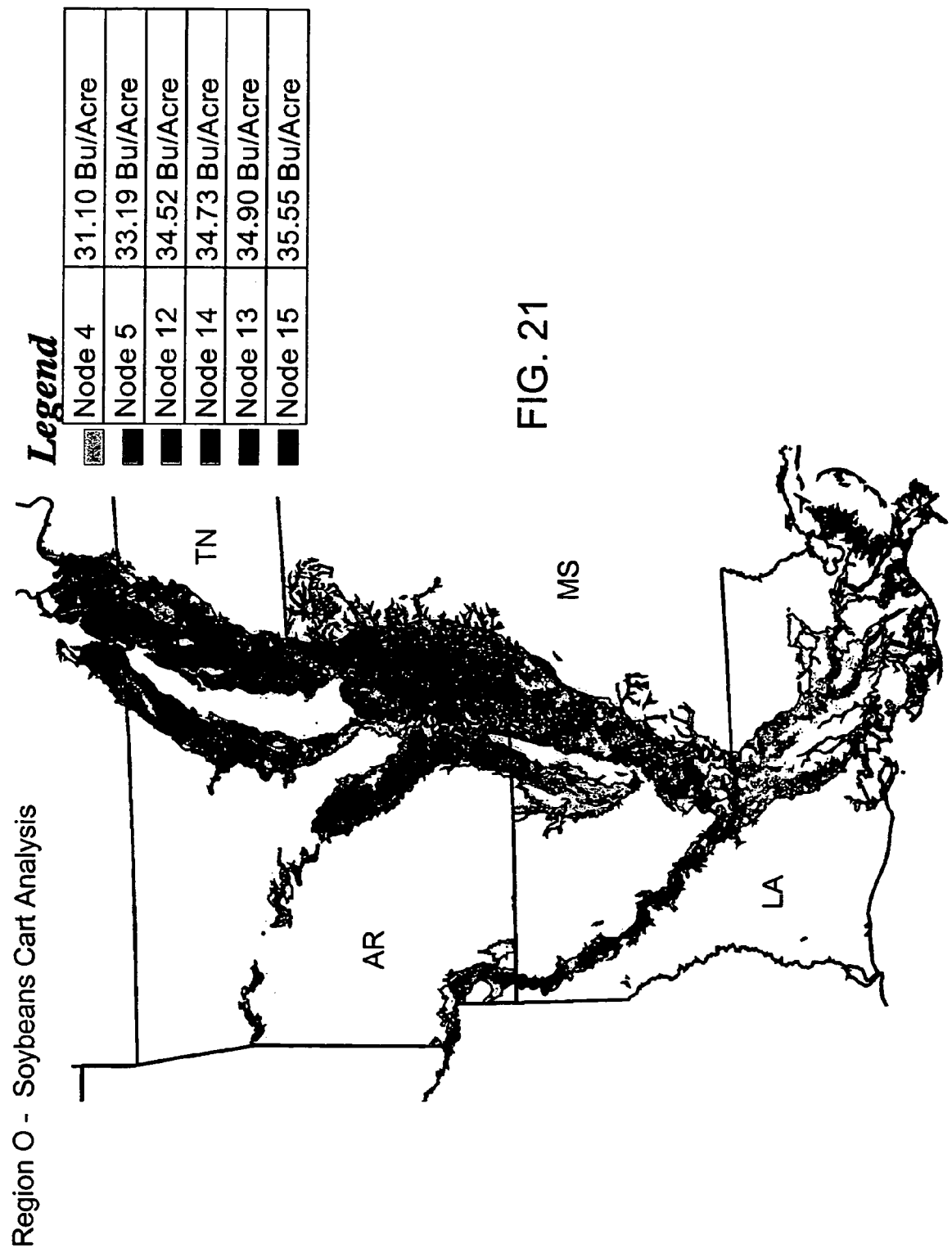
FIG. 21 is an illustrative map, of average yield contours in region O, which is consistent with the decision tree analysis of FIG. 20.
Figure 22:
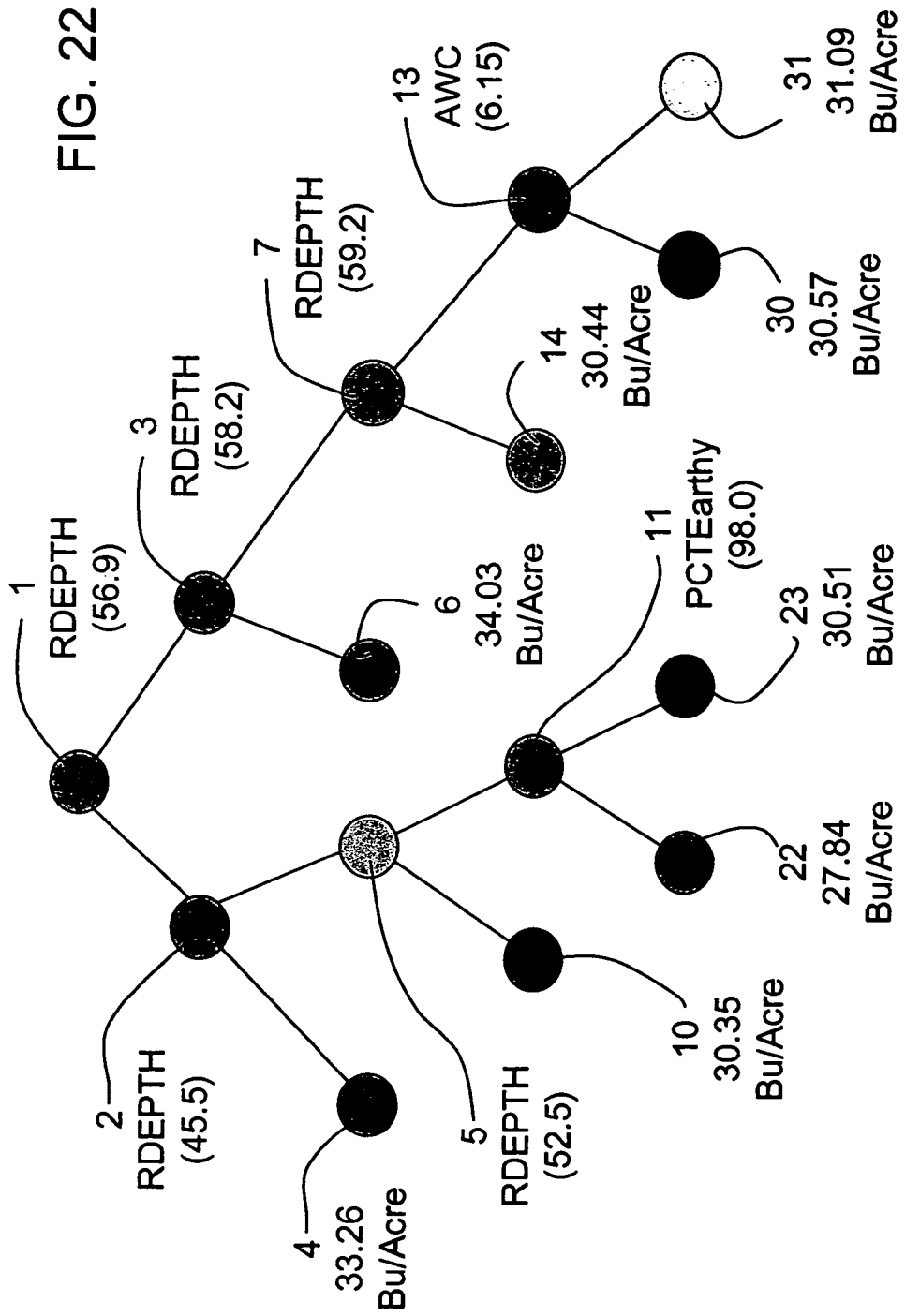
FIG. 22 is an illustrative decision tree analysis for soybeans as a crop in region T.
Figure 23:
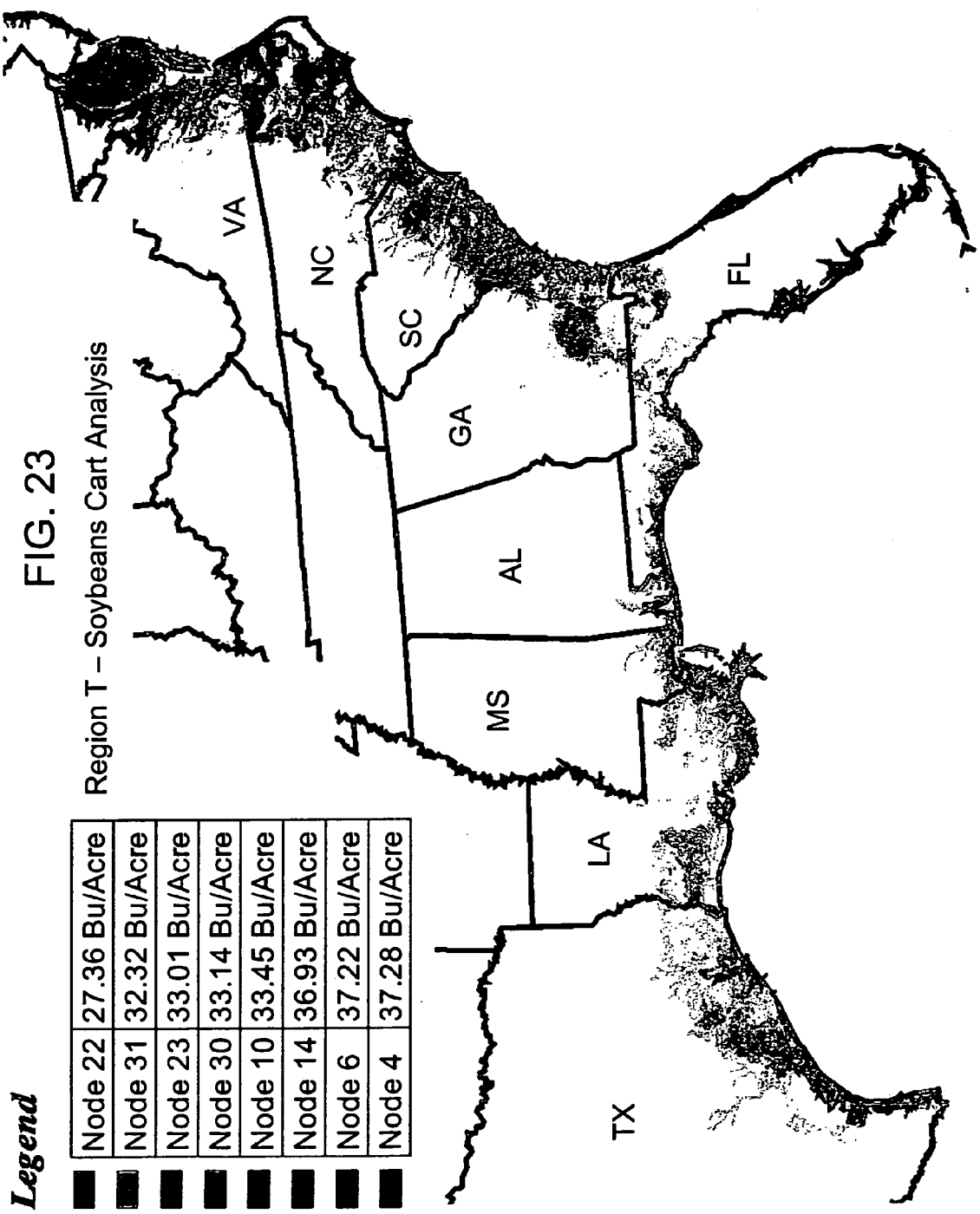
FIG. 23 is an illustrative map, of average yield contours in region T, which is consistent with the decision tree analysis of FIG. 22.
Figure 24:
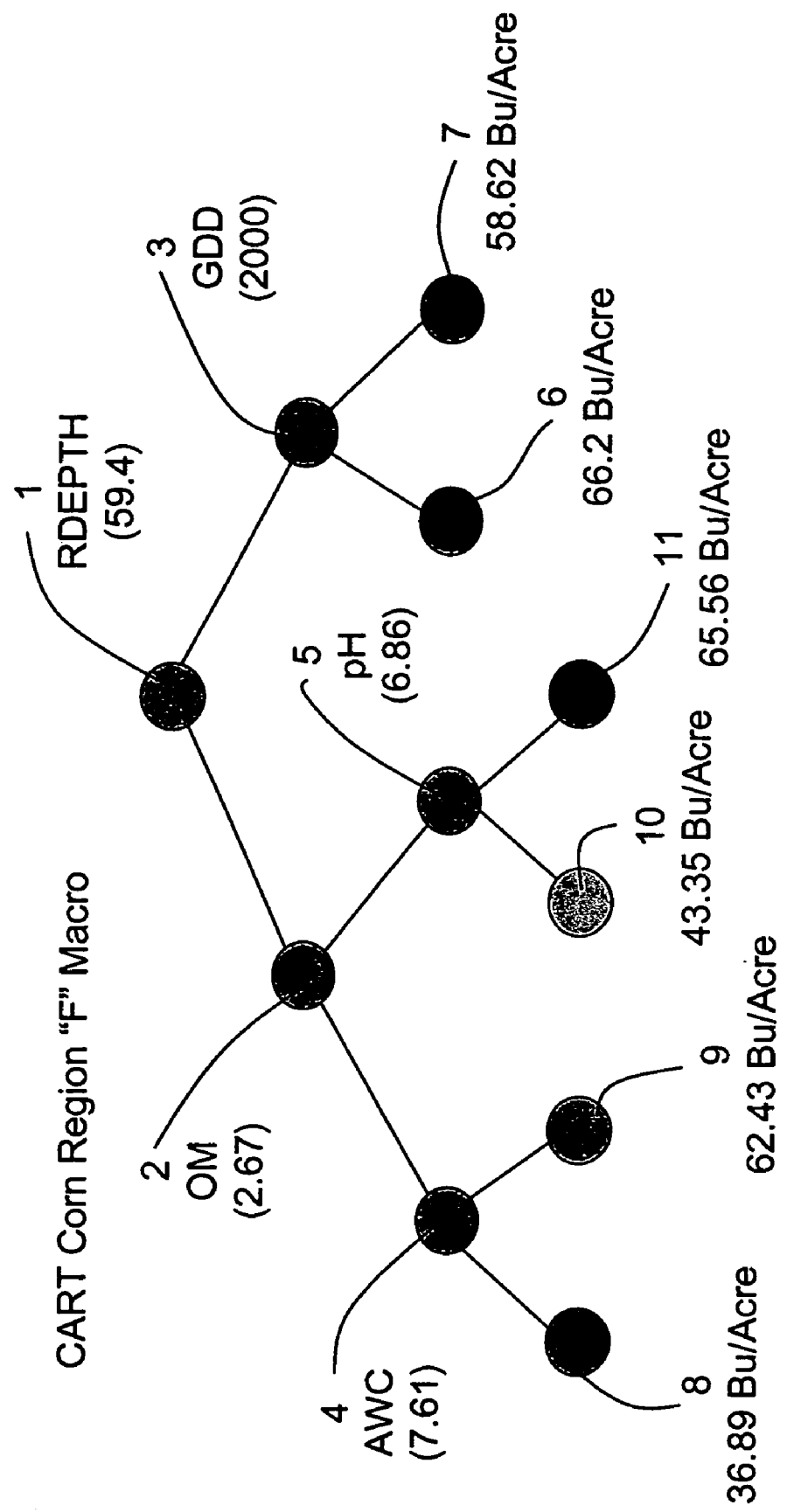
Figure 26:
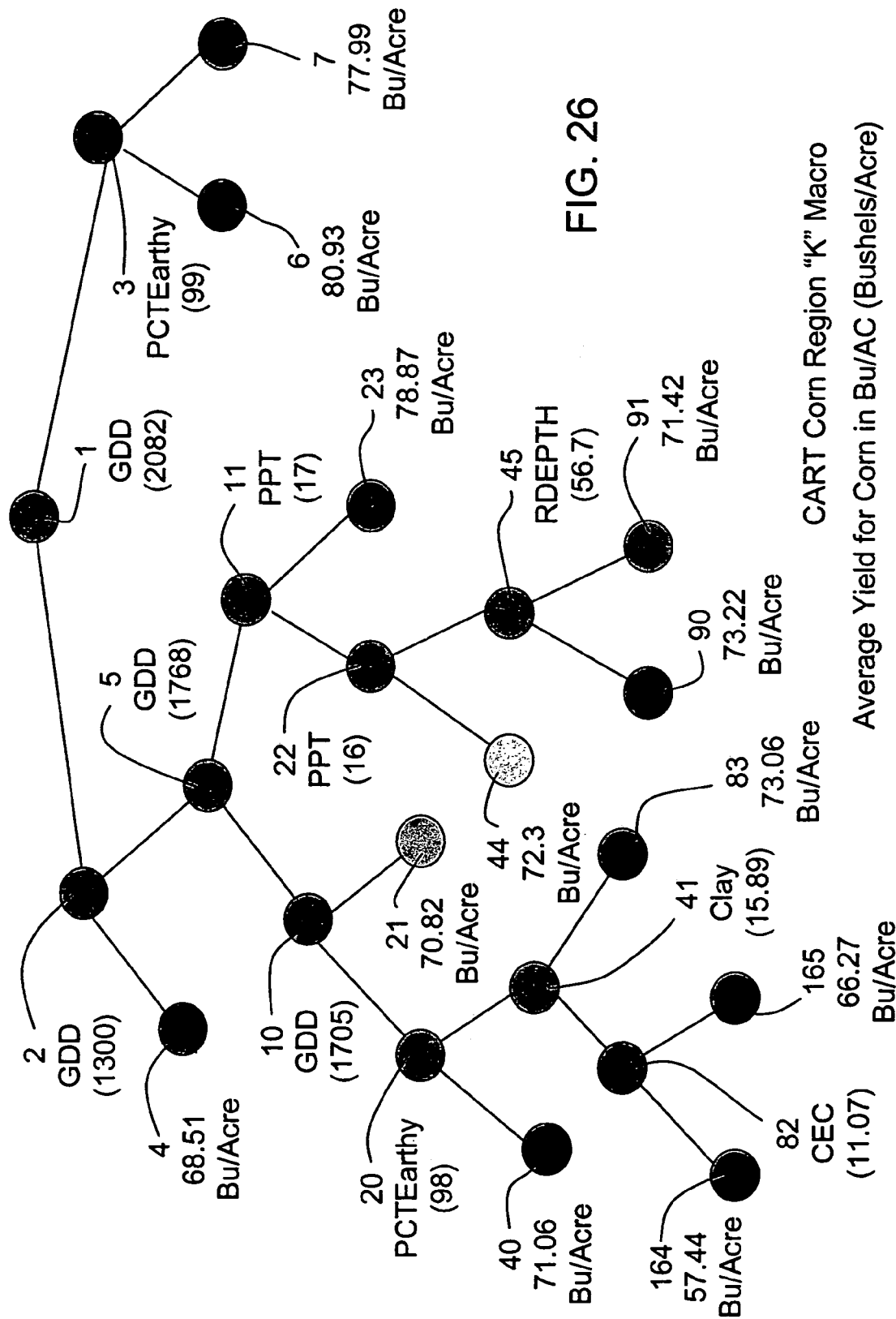
Figure 27:
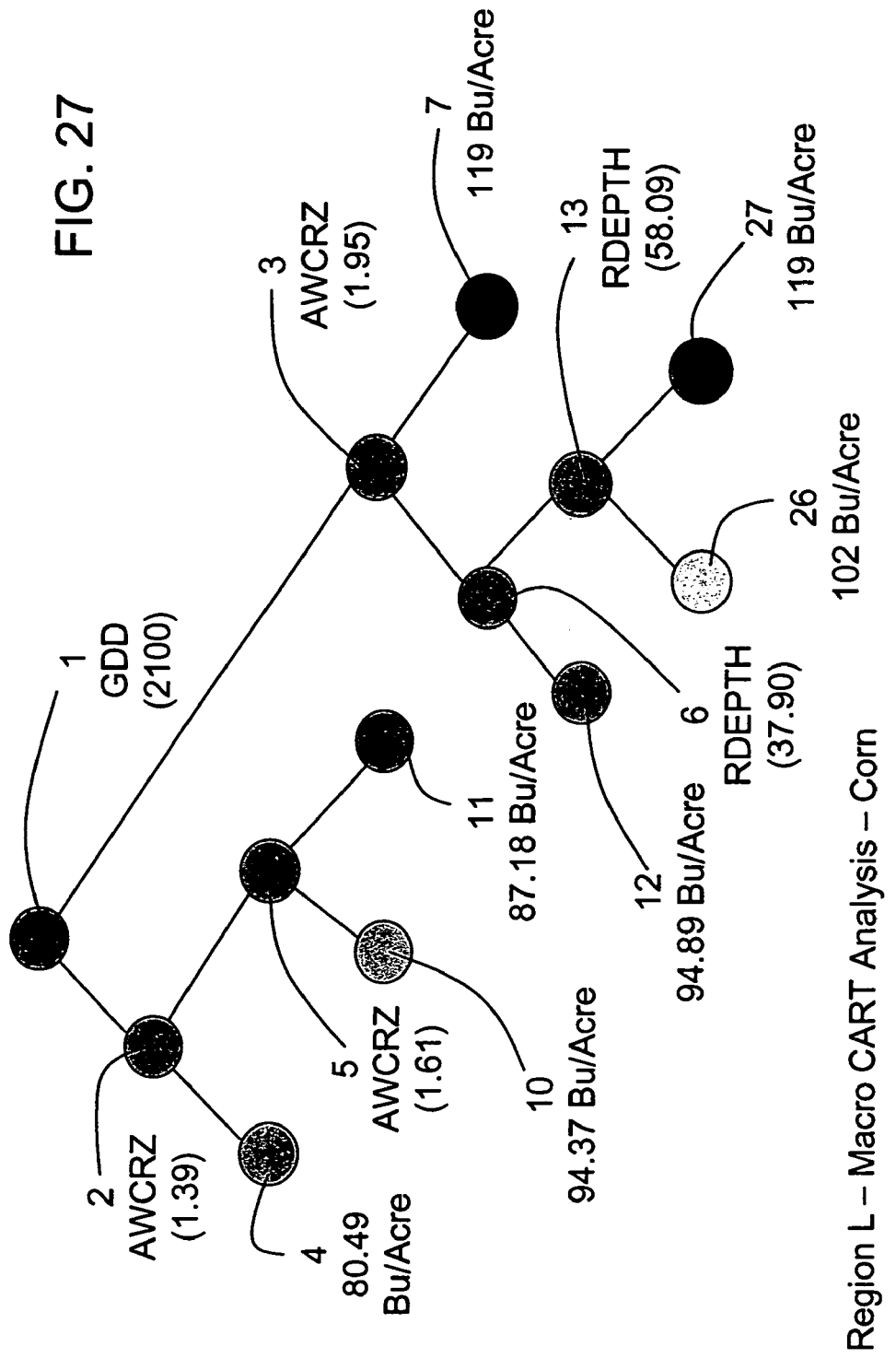
Figure 28B:
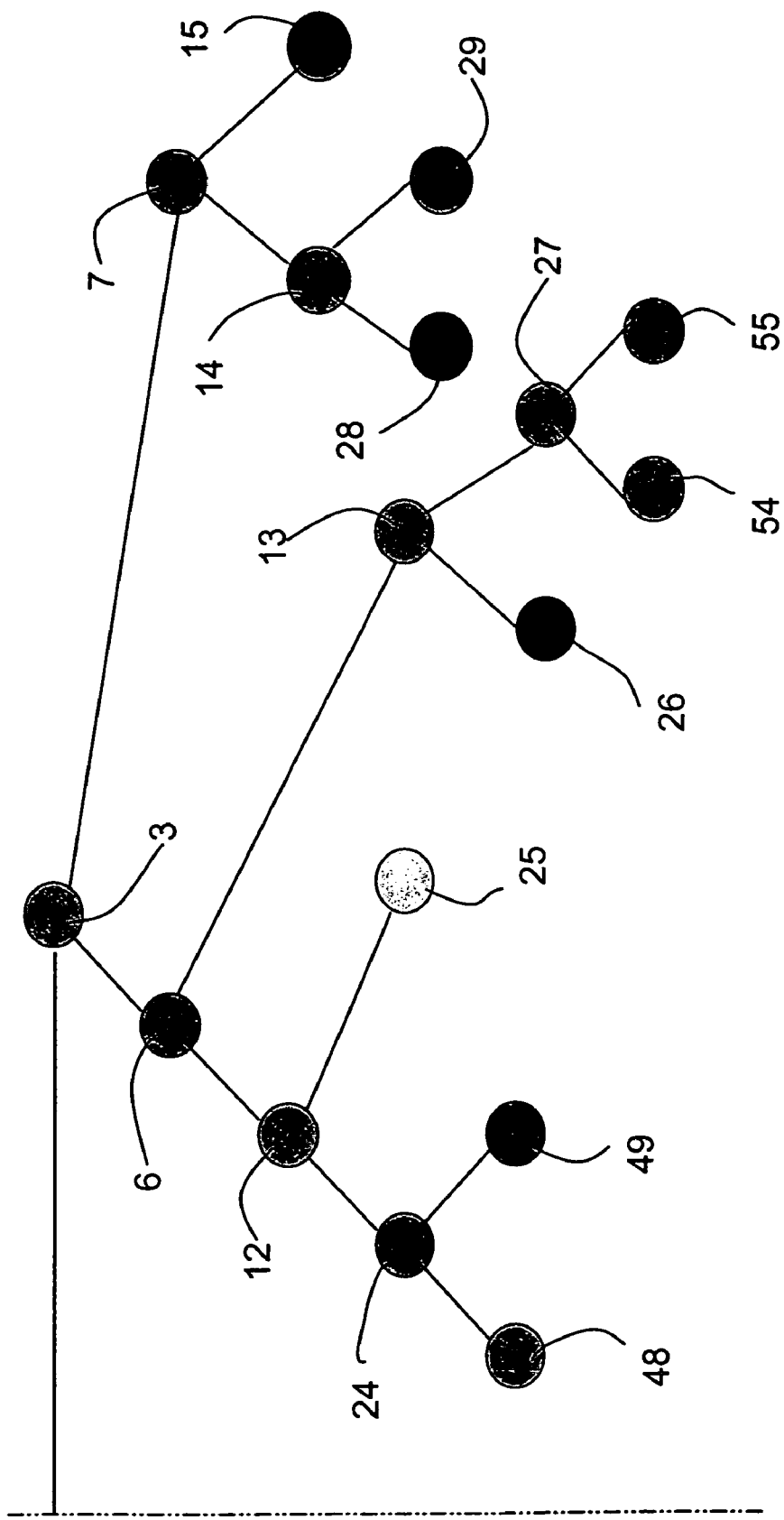
Figure 29:
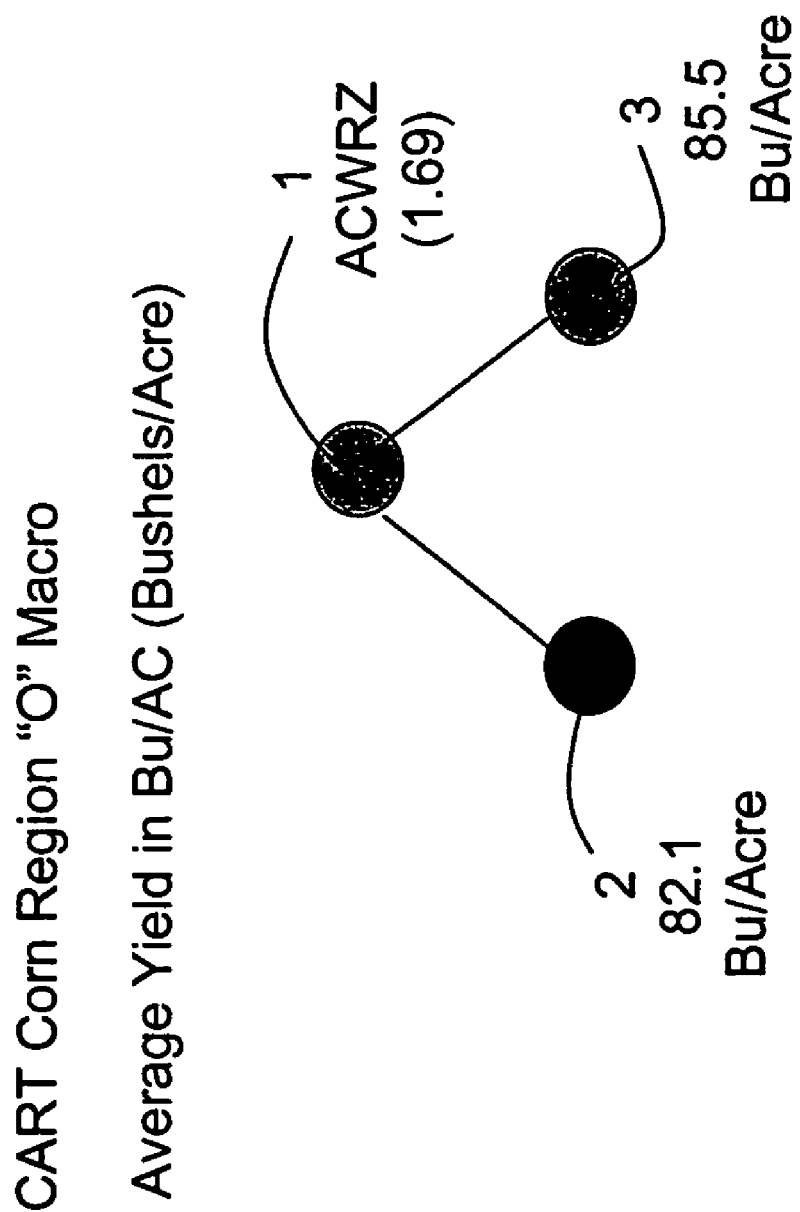
Figures 30, 30A:
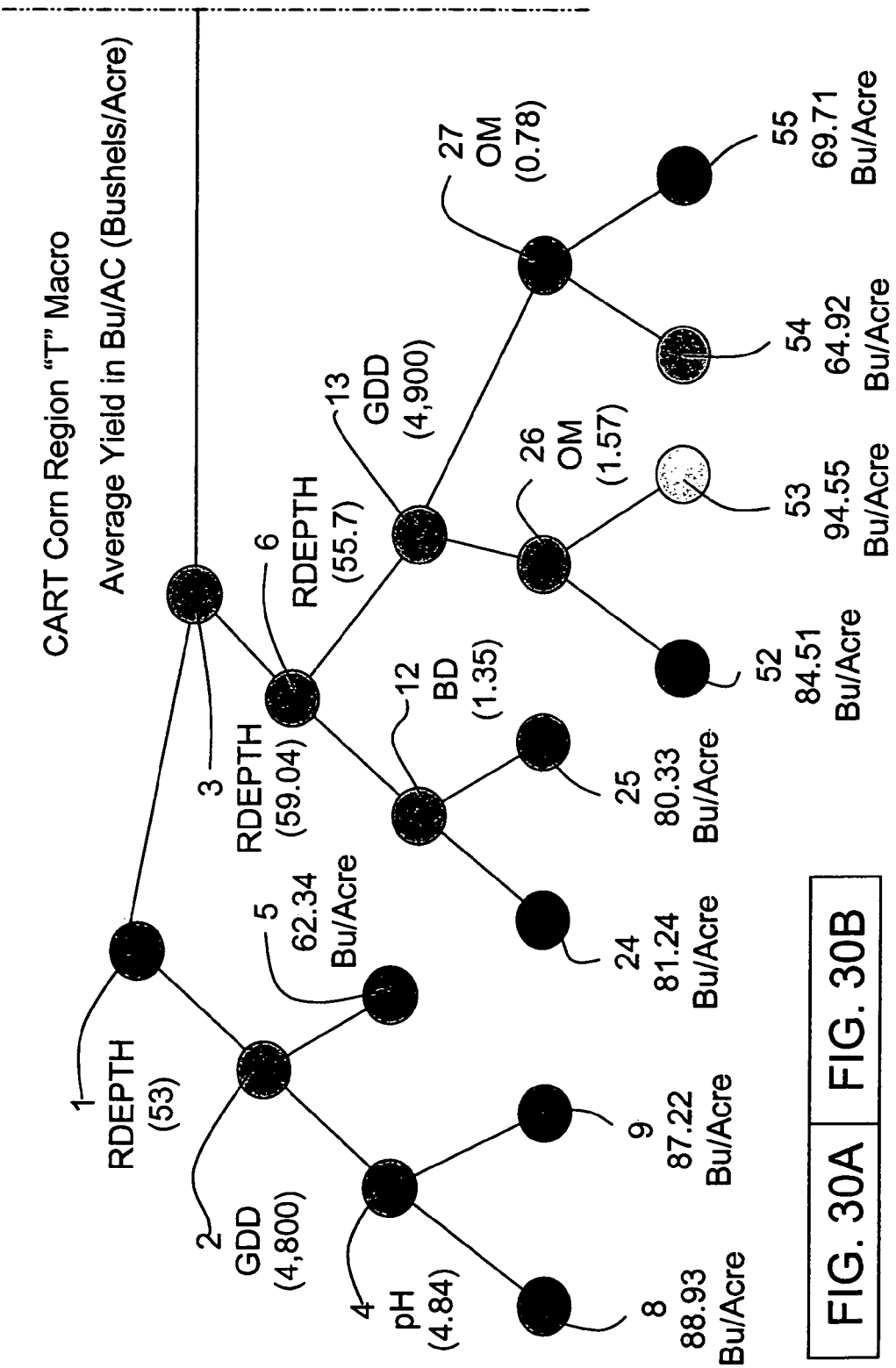
Figure 30B:
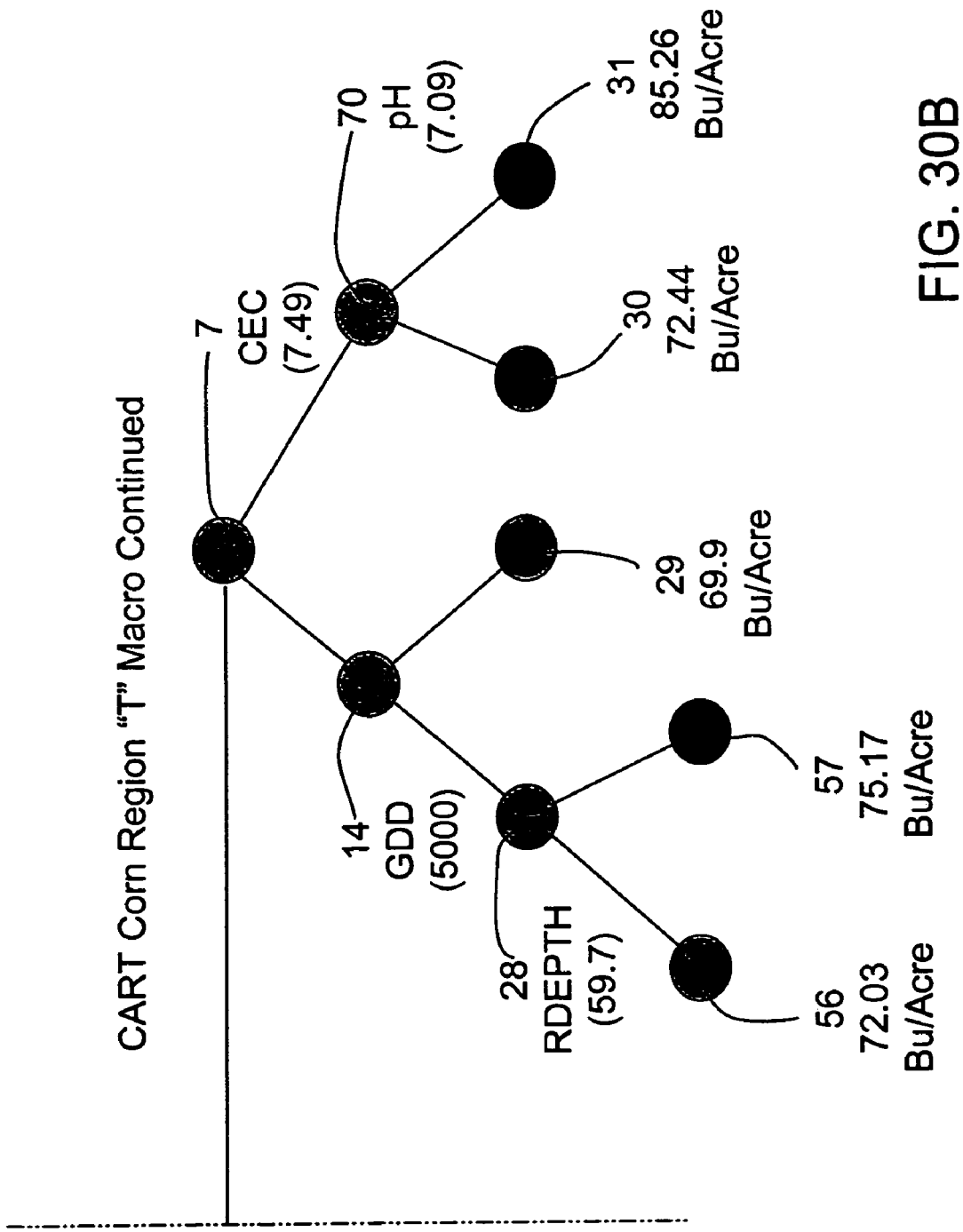

FIG. 8 is a method for marketing an agricultural product. The method of FIG. 8 starts in step S400.

In step S400, a database of performance data versus location data on an agricultural crop is established or accessed. The database may be created by executing any of the methods of FIG. 3 to FIG. 7. In an alternate embodiment, the database may contain performance data, location data, and environmental data. In yet another alternate embodiment, the database may contain performance data, location data, environmental data, and genetic data.

In step S402, marketing data is associated with the database. For example, the marketing data is integrated with the performance data. The marketing data comprises one or more of the following: demographic data, customer data, historic sales data, census data, and publicly available governmental data. The marketing data may have corresponding geographic information that is correlated to, or matched with, the location data to align and integrate the marketing data and the performance data.

In one illustrative example of step S402, the marketing data may comprise statistical demographic data, geopolitical data or both. The soil data, climate data, weather data or other environmental data of the database may be supplemented with statistical demographic data and geopolitical data, for example. Statistical demographic data may be gathered from public records, marketing services, customer lists of businesses, census bureau information or surveys or other sources. Geopolitical data includes boundaries of counties, boundaries of cities, boundaries of countries and other territories, along with the location of transportation routes.

In step S404, a marketing plan is defined based on integrated data of the database and the marketing data. The marketing plan may be defined in accordance with several alternative techniques, which may be executed alone or cumulatively.

In accordance with a first technique for establishing a marketing plan, the market is defined by a preferential list of one or more customers selected, based on the integrated data. Customers may be targeted based on income, property size, real estate value, size of dwelling or other customer attributes such that the customer's needs may coincide sufficiently with the product offering. For example, a seller of lawn mowers as a product may target customers with a lawn of a certain minimum size and would avoid targeting high-rise condominium owners.

The seller or distributor of seeds, saplings, plants or precursors to a crop or other products may have access to environmental data, product performance data, grower performance data, and geographic data for formation of a targeted preferential customer list for marketing of products. The seller or distributor can add real value to the sales process by providing the customer-grower with a product that is the best technical fit for the customer-grower's environment and previous grower performance data. Further, specific growers may be assigned to each product or a pool of suitable or available products to assist in direct marketing and targeting sales.

In accordance with a second technique, the market plan is defined by a market size and/or market location selected based on the integrated data. The market may be determined in part by an available production environment associated with a certain geographic market location that contains grower-customers. The yield of a crop from one or more test sites may be used to provide an estimate of the market size of the crop. If the test sites are in conformity with the environmental aspects of a larger geographic area, the performance data or average yield data may be extrapolated to the larger geographic area or some portion thereof. The market size may be determined based on the estimated yield for the crop, the geographic extent of the estimated yield, and commodity prices or other applicable prices for the product.

The market location may be characterized by the composition of soil data, climate data, weather data, and other environmental characteristics. Market locations may be classified by farming practices and the attendant production environment including: (1) soils, (2) county units, (3) small or large grain, and (4) climate.

The total market value for a class of interchangeable products and for corresponding geographic area or region represents one measure of the market size. The total market value may be assigned to a corresponding trade area. The seller may have transactional records that pertain to its sales of identified products to customers (e.g., growers) in the total market area. For example, the customer-grower may be assigned to a nearest or most representative locational node and a product type (e.g., seed, crop or product identifier) on an annual basis, and transactional statistics (e.g., quantity of seed purchased and price) may be kept for each grower.

Further, if the average yield per land unit for a particular crop, the size of tillable land dedicated to the particular crop for a growing season, and an estimated sales price of the particular crop is known for a corresponding trade area, the income level of the growers within the trade area may be determined, among other information, that may determine what products are marketable within the trade area.

Market share may be defined as one seller's aggregate gross sales for a given geographical scope (e.g., a trade area) and temporal scope (e.g., a fiscal quarter or year) divided by the total gross sales of all competitive sellers for comparable products for the given geographical and temporal scope. Accordingly, market share is readily calculated for the trade area and market potential is established. A seller can assess how effective agricultural products (e.g., seeds or precursors to particular crops) are in a market, compared to competitive offerings of other agricultural products.

In one embodiment, the data analyzer or a computer program may provide a market share calculation. When transactional data (e.g., sales data) is incorporated, relative market shares of different sellers can be calculated. Using the land area (e.g., number of acres) of crop by producer, a share of the market can be calculated. Producers can be classified by size, income, yield potential, and then the market of each segment assigned. A profile can be created using current customers as the base with the profile, and then projected to the universal market to determine market potential.

In accordance with a third technique, the market plan is defined by a product identifier associated with one or more preferential crop varieties for a corresponding geographic location based on the integrated data. The product identifier may refer to seeds, a precursor of a preferential crop variety, or a derivative of a preferential crop variety. The map or other data output from any of the crop evaluation methods disclosed herein may allow sellers (e.g., seed providers) to market or sell products (e.g., seeds) in geographic regions with characteristics that support maximizing the expression of a genetic trait of a crop or otherwise enhancing genetic performance of the crop.

Here, the marketing data of step S402 may include map data or image data for facilitating identification of the location of the grower's land with respect to a map or another representation of generally uniform performance levels (e.g., average yield per land unit for a particular crop). In one embodiment, the image data may represent satellite or aerial images of farm land or other land. The boundaries of fields may be determined based on satellite images. The satellite images are commercially available on the internet as DOQQ (Digital Ortho Quarter Quads), (i.e., infrared maps from satellites based on lower resolution levels than the highest technically feasible resolutions).

A user, grower or salesperson that is involved in a potential transaction involving seed, a precursor to a particular crop or another agronomic input may open or activate an image file for a general region in which the grower's owned or leased land is located. The image file (e.g. satellite digital photograph) is displayed on a display (e.g., a monitor). A pointing device (e.g., a computer mouse) may be used to select a portion of the visible land of the grower. Different points or areas on the image represented by the image file are associated with different environmental characteristics. Hence, different areas are associated with different corresponding preferential crop products or preferential seeds. In other words, different points or areas of the image may be associated with corresponding node recommendations for product identifiers of seed or other precursors that are well suited for the geographic node. All growers associated with the same node get the same recommended crop or list of crop or seed precursors from which to choose. The crop precursors and seeds may be limited to, or restricted to, the product offerings of one or more seed developers, seed distributors or suppliers. The boundaries of the different recommendations are the environmental data (e.g., soil data) layer underneath, not the field image (e.g., satellite digital photograph) layer that overlays it. Layers refers to the relative relationship of different sets of data and the ability of, or restrictions on, the different sets to interact, along with any rules (e.g., logical rules) and any data structures that affect the relationship. The integrated images provide a view of towns and highways where one can pan and zoom, if desired. Reference street names and highways could be added to facilitate spotting or identification of a grower's field.

Certain agricultural products, such as seeds, can be sold to a grower at a one-on-one sales call if the grower is greater than a minimum threshold size. Growers that are greater than a minimum threshold size, in sales of crops or in tillable land size, may be identified pursuant to marketing data, historic sales data of a seller or other available information. The evaluation of crop performance versus geography may allow the seller (e.g., seed supplier) to offer only those agricultural products (e.g., crop products or seeds) that are well-suited for the environment of a particular producer in a particular geographic area. Accordingly, the seller or seed distributor may bring a computer program that facilitates association of the grower's land with a list of agricultural products (e.g., preferential crops or respective seeds) that are well suited for a particular geographic area.

In accordance with a fourth technique, the market plan is defined by a product identifier associated with one or more preferential genetically modified crop products for a corresponding geographic location based on the integrated data. The product identifier may refer to seeds, a precursor of a preferential crop variety or a derivative of a preferential crop variety. Each test site for growing crops is associated with various defined geographic areas to gather geographically relevant performance data. The performance data on a particular crop supports the seller's provision or offering of the right product for the right grower in the right field. The data analyzer or a computer program may provide a graphical map of roads or other identifiable features to facilitate identification of the grower's field. If the user clicks on any location (e.g., the user's field) within the graphical map, the data processor will provide a recommended product (e.g., a particular variety of crop) or list of applicable products that are determined to be compatible with, or well suited for, the location.

The data analyzer or a software program may support inventory management of the seller by determining applicable product identifiers and estimating sales quantities of the product identifiers for a geographic region. A seed supplier may determine an inventory level of products for producers within the geographic region based on the supplier's market share and the estimated sales quantities and corresponding product identifiers for the geographic region. Inventory control is significant for seed products and other agricultural products because of obsolescence.

A seed supplier may regularly introduce new seeds as breeding or genetic advances are made in the seed. A seed may have a definite, discrete product life cycle. Seed has a limited shelf-life and a market that may diminish over time, as advances are made in disease resistance, drought tolerance, and other plant features. During the product life cycle, the sales volume of a new product increases over time until sales plateau. After sales plateau and the seed product is mature, sales may decrease over time. Accordingly, it is advantageous to switch over or offer a new seed or product based on a realistic inventory planning prior to a significant sales decrease in the obsolete seed or product offering.

FIG. 9 is a chart of soil factors and sub-factors for the SRPG that may be used to define soil data in accordance with any of the methods set forth herein. The chart groups soil factors into seven main categories including: surface structure and nutrients, water features, toxicity, soil reaction, climate, physical profile, and landscape. A series of sub-factors are associated with each factor as shown in FIG. 9.

In FIGS. 10 through 30B, inclusive, various abbreviations pertain to certain soil factors, soil sub-factors or other environmental factors. For explanatory purposes, the abbreviations and their meanings are summarized here. Organic matter is abbreviated OM; bulk density is abbreviated BD; clay content is abbreviated Clay; pH is abbreviated pH; calcium carbonate is abbreviated CACO3; physical root zone limitation or root depth is abbreviated RDepth; root zone available water capacity is abbreviated AWCRZ; available water capacity is abbreviated AWC; growing degree days is abbreviated GDD. PPT means precipitation (in inches) or in height. In an alternate embodiment, precipitation may be measured by depth, volume, duration, rate or some other unit of measurement. PCT "earthy" refers to the "percent earth", which represents a volumetric ratio of soil (e.g., clay, organic matter, sand, particulate matter, and other matter) to the sum of rocks, stones, gravel, and cobble that exceed a certain minimum threshold size per unit volume of soil. The minimum threshold size may be measured with respect to mesh or screen of a certain dimension, for example.

With respect to the decision tree analysis illustrated for various geographic regions in FIG. 10 through FIG. 30B, each decision tree is composed of various nodes. Each node represents a key or critical environmental characteristic that was identified through a decision tree analysis of one or more of the following: environmental data, soil data, climate data, weather data, performance data, and location data. The key or critical environmental characteristic may be a determinant factor in the performance of a particular crop or a variety of a particular crop based on environmental and performance measurements associated with, or collected at, one or more test sites. The tests sites are affiliated with a corresponding geographic region such that the test sites are generally representative of the environmental data or soil data of the geographic region as a whole. An environmental characteristic is a determinant factor if it determines or impacts the performance of particular crop in a predominate, contributory way or in a more statistically significant way than other variables or environmental characteristics. Further, each critical environmental characteristic may be identified by an environmental data identifier, which may be associated with a corresponding critical value. The critical value represents a factor that contributes to the performance level of the particular crop in a defined geographic area within a geographic region. For example, a first geographic area, where the particular crop exceeds a critical value of an environmental data identifier for the particular crop, may be associated with a distinct performance level that is distinguishable from that of a second geographic area, where the particular crop is less than a critical value of an environmental data identifier. Here, both the first geographic area and the second geographic area represent subsets of the geographic region.

Each node may be representative of a different geographic scope of an entire geographic region. The highest parent node generally has a greater geographic scope than the child node. The highest parent node represents the entire geographic region. The lowest child nodes represent the geographic areas of generally uniform performance levels (e.g., generally uniform yields). Intermediate nodes may be present between the highest parent node and the lowest child node. The intermediate nodes may represent a geographic scope between the overall region and any defined geographic area having a generally uniform performance level.

Each node has a node identifier, which as illustrated (in FIG. 10 through FIG. 30B), represents any whole number between 1 and 189. Each node is associated with an environmental identifier, such as a soil data factor and a corresponding critical value of the soil data factor. Any node may be regarded as a parent node if child nodes or other nodes extend therefrom. Accordingly, intermediate nodes may be considered both parent nodes and child nodes, depending upon the frame of reference. An intermediate node represents a child node with respect to a parent node above it; the same intermediate node represents a parent node, with respect to child nodes stemming from and below it. The critical values of the nodes may be selected to split the environmental data into two groups with respect to the performance levels. That is, one child of a parent node generally has superior performance or contributes to the superior performance of another child of the same parent node. Although critical values are set forth in parentheses by each node in FIG. 10 through FIG. 30B, the critical values are merely illustrative and actual critical values may differ. The critical values are associated with the normal and customary units for each environmental datum, which are known to those of ordinary skill in the art of soil science, for example.

The ultimate or lowest child nodes are associated with distinct corresponding performance levels. For example, each performance level may represent a generally uniform yield. Each ultimate or lowest child node inherits all of the environmental characteristics of the nodes above it. Therefore, it is possible to list the conditions (e.g., critical environmental factors and associated critical values) associated with each lowest child nodes as those conditions that are present to produce the performance level of the child node.

For example, one node may be associated with growing degree days as a critical environmental factor. Growing degree days provides an overall figure of merit based on the amount of sun and heat available to support plant-life. Areas with less than a minimum number of growing degree days (i.e., a critical value) will not support a particular crop. Another node may be associated with pH as a critical environmental factor. The pH is a measure of acidity or alkalinity of the soil. If the pH is in a certain desired range or below a critical value, the performance level may be better than if the pH is greater than a critical value or outside of the desired range. Yet another node may represent the root depth of a crop as a critical environmental factor. Still another node represents a water holding capacity in the root zone as the critical environmental factor. The nodes may be graphically shown in a chart, where the lowest node inherits all of the critical environmental factors and related critical values of the higher nodes above it. The lowest child nodes indicate or regress to the average yields for a particular crop. Weather data may be dynamic and in real time to improve the accuracy of yield determination that appear on the lowest child nodes.

With respect to the contour maps appearing in FIGS. 11, 13, 15, 17, 19, 21, and 23, the maps of performance levels are based on the decision tree analysis. The maps only depict the performance levels versus geographic area for each of the lowest or ultimate child nodes of the corresponding decision trees in FIG. 10 through FIG. 22. Different ultimate child nodes or different performance levels (e.g., average yields of a particular crop) are shown as covering different geographic areas of a geographic region. Although the geographic areas with generally uniform performance levels may be indicated by different colors or shades of colors, other graphical and non-graphical techniques can be used to identify distinct performance levels and performance contours.

The performance level versus geographic location information of the maps or tabular output may be integrated with ancillary marketing information or geopolitical information, such as country boundaries, state boundaries, county boundaries, city boundaries, infrastructure, roads, highways, rivers, lakes, and even street addresses of potential customers in the geographic area or region. Although the contour maps in FIGS. 11, 13, 15, 17, 19, 21, and 23 illustrate the boundaries of various states in the United States, in practice, other boundaries may be shown and different territories or countries may be evaluated other than those shown.

The decision trees illustrated in FIGS. 12, 14, 16, 18A, 18B, 20, and 22 pertain to average yields in bushels per acre of soybeans as an illustrative crop, whereas the decision trees illustrated in FIG. 24 through FIG. 30B apply to the average yields in bushels per acre of corn as an illustrative crop. The inherited characteristics of each lowest child node reflect the determinant environmental factors and corresponding levels for the particular crop (e.g., soybeans or corn).

FIGS. 11, 13, 15, 17, 19, 21, and 23 show contour maps that represent yields in bushels per acre for soybeans, although similar maps may apply to any other crops, such as corn. Accordingly, the decision trees of FIG. 24 through FIG. 30B for corn may be depicted on contour maps that are similar to those of FIGS. 11, 13, 15, 17, 19, 21, and 23 for soybeans, except that (a) the contour maps for corn would express the performance levels (e.g., yield levels for corn) and (b) the contour maps would contain distinct geographical contours or areas that possess the determinant environmental factors and corresponding levels set forth in the applicable decision trees for corn. To the extent that the determinant environmental factors for corn and soybeans differ, the contours would differ for the same regions, even if the distinct yield ranges or yield levels for corn and soybeans were normalized or otherwise correlated. The determinant environmental factors for a region may be static or may vary over time, depending upon the particular environmental factor. Certain determinant environmental factors may remain generally static or range-bound over long periods of time. Accordingly, contour maps could potentially vary from year to year, even for the same crop, if the resolution of the contour map is sufficient to reveal variations in determinant environmental factors and if the determinant environmental factors vary materially.

In accordance with various embodiments of the method and system of crop evaluation, a producer may contract in advance with a processor or another purchaser to grow a certain quantity of a crop at a certain defined geographic area, with particular desirable characteristics that are compatible with the geographic area. For example, the processor may want to enter into a contract with a producer in which the producer agrees to provide a certain type or variety (e.g. high protein or genetically modified protein profile) of corn at a certain time. The processor or crop purchaser may be able to optimize its manufacturing process to take advantage of a scheduled and reliable supply of a raw agricultural product when variability to environmental factors is mitigated. The yields of processors of agricultural products may be impacted by the characteristics of the agricultural products. The processors may seek to purchase agricultural products from sources that produce the highest yield of derivative products (e.g., baked goods) based upon the agricultural product (e.g., wheat).

This specification describes several embodiments of inventions related to a system and method for evaluating a crop. Other embodiments, variations, and modifications may be covered by the claims.

We claim:

1. A method for evaluating performance of a crop, the method comprising the steps of:
   obtaining environmental measurements associated with a geographic region, each environmental measurement including at least one of soil data derived from measurements of a soil characteristic sensor and weather data derived from measurements of a weather sensor;
   obtaining respective location data associated with corresponding environmental measurements;
   determining an estimated performance characteristic for a particular crop planted in the geographic region based on the obtained environmental measurements and respective location data;
   establishing contours of one or more uniform performance areas with generally uniform performance characteristic within the geographic region by applying a decision-tree analysis to the obtained environmental measurements; and
   determining a yield as the performance characteristic of the particular crop of a particular grower within a corresponding contour and;
   characterizing the yield of the particular crop of the particular grower as conforming or nonconforming with respect to the particular contour.

2. The method according to claim 1 wherein the environmental measurements are associated with corresponding test sites defined by the location data.

3. The method according to claim 1 wherein the generally uniform performance characteristic comprise generally uniform average yield of the particular crop.

4. The method according to claim 1 wherein the generally uniform performance characteristic comprises an attribute of a crop comprising one or more of the following: a protein content, an oil content, a protein profile, a storage characteristic, a ripening characteristic, mold resistance, a genetic characteristic, and a genetically modified characteristic.

5. The method according to claim 1 wherein the weather data is selected from the group of measurements consisting of growing degree days, rainfall, rainfall range, temperature, temperature range, night-time temperature, day-time temperature, hours of sunlight, frost date, last spring frost, first fall or winter frost, soil temperature, air temperature, and humidity.

6. The method according to claim 1 wherein the soil data comprises one or more of the following soil factor classifications: surface structure and nutrients, water features, toxicity, soil reaction, climate, physical profile, and landscape.

7. The method according to claim 1 wherein the soil data comprises one or more of the following factors: root depth, soil acidity, soil alkalinity, soil pH, water retaining capacity of soil, organic matter content, bulk density, clay content, available water capacity, sodium adsorption ratio, calcium carbonate content, gypsum content, cation-exchange capacity, shrink-swell cycle, shrink-swell attributes, gravel, cobble and stone content, soil porosity, soil structure, solid texture, biological activity, soil compaction, available water capacity, soil shrinkage, water table, permeability, salinity, moisture regime, temperature regime, moisture/temperature regime, physical root zone limitation, root zone available water capacity, slope, other soil phase features, ponding, degree of erosion, and flooding.

8. The method according to claim 1 wherein each established contour is associated with a group of environmental measurements, each environmental measurement having a particular average value or one particular value range.

9. The method according to claim 1 wherein each established contour defines one or more noncontiguous areas with generally uniform performance characteristics of the crop.

10. The method according to claim 1 wherein the establishing comprises applying a Classification and Regression Tree analysis as the decision-tree analysis.

11. The method according to claim 1 further comprising:
presenting the established contours on a map wherein the contours are represented by at least one of curved line segments, straight line segments, and any combination of the foregoing segments.

12. The method according to claim 1 further comprising:
presenting the established contours on a map wherein the contours are represented by different colors or different shading.

13. The method according to claim 1 wherein the particular crop is a genetically modified organism.

14. The method according to claim 1 wherein the particular crop is selected from the group consisting of genetically modified corn, genetically modified soybeans, a genetically modified potato, a genetically modified vegetable crop, and a genetically modified crop.

15. The method according to claim 1 further comprising:
identifying contours associated with specific corresponding environmental characteristics;
allocating geographic growing areas within the identified contours for growing of a corresponding particular crop during a prospective growing season.

16. The method according to claim 1 wherein the soil data comprise a preferential soil nutrient profile that is suited for growing the particular crop.

17. A method for evaluating performance of a crop, the method comprising the steps of:
obtaining environmental measurements associated with a geographic region, each environmental measurement including at least one of soil data derived from measurements of a soil characteristics sensor and weather data derived from measurements of a weather sensor;
obtaining respective location data associated with corresponding environmental measurements;
determining an estimated performance characteristic for a particular crop planted in the geographic region based on the obtained environmental measurements and respective location data;
establishing contours of one or more uniform performance areas with generally uniform performance characteristic within the geographic region by applying a decision-tree analysis to the obtained environmental measurements;
determining a yield as the performance characteristic of a particular crop within a corresponding contour; and
comparing the yield of the particular crop with respect to a reference yield of a control group crop in the particular contour to determine if the particular crop is genetically superior to the control group crop.

18. The method according to claim 17 wherein the environmental measurements are associated with corresponding test sites defined by the location data.

19. The method according to claim 17 wherein the generally uniform performance characteristic comprise generally uniform average yield of the particular crop.

20. The method according to claim 17 wherein the generally uniform performance characteristic comprises an attribute of a crop comprising one or more of the following: a protein content, an oil content, a protein profile, a storage characteristic, a ripening characteristic, mold resistance, a genetic characteristic, and a genetically modified characteristic.

* * * * *